(12) United States Patent
Akiyama

(10) Patent No.: US 11,630,264 B2
(45) Date of Patent: Apr. 18, 2023

(54) OPTICAL ELEMENT AND OPTICAL TRANSMITTER

(71) Applicant: FUJITSU LIMITED, Kawasaki (JP)

(72) Inventor: Tomoyuki Akiyama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/462,049

(22) Filed: Aug. 31, 2021

(65) Prior Publication Data

US 2022/0146755 A1     May 12, 2022

(30) Foreign Application Priority Data

Nov. 11, 2020    (JP) .............................. JP2020-187728

(51) Int. Cl.
    *G02B 6/293*       (2006.01)
    *G02B 6/12*        (2006.01)
    *G02F 1/225*       (2006.01)

(52) U.S. Cl.
    CPC ..... *G02B 6/29355* (2013.01); *G02B 6/12007* (2013.01); *G02F 1/225* (2013.01)

(58) Field of Classification Search
    None
    See application file for complete search history.

(56) References Cited

U.S. PATENT DOCUMENTS

2018/0034555 A1\* 2/2018 Goh .................. G02B 6/29355
2019/0245642 A1\* 8/2019 Akiyama ........... G02B 6/29355

FOREIGN PATENT DOCUMENTS

JP     2019-135524 A     8/2019

OTHER PUBLICATIONS

Leimeng Zhuang et al., "Nyquist-Filtering (De)Multiplexer Using a Ring Resonator Assisted Interferometer Circuit", Journal of Lightwave Technology vol. 34, No. 8, pp. 1732-1738, Apr. 15, 2016 (Total 7 pages).

\* cited by examiner

*Primary Examiner* — Chad H Smith
(74) *Attorney, Agent, or Firm* — Fujitsu Patent Center

(57) ABSTRACT

An optical element including a plurality of first circuits, the optical element includes a first cascade circuit in which one or more of first circuits are connected in cascade, a second cascade circuit in which one or more of first circuits are connected in cascade, and a combiner circuit configured to connect the first cascade circuit and the second cascade circuit. A first circuit included in the plurality of first circuits includes a first cascade structure in which N (N is an integer of 1 or larger) of 2-input and 2-output phase shifters and (N+1) of 2-input and 2-output couplers are alternately connected in cascade, and a first controller configured to control the N phase shifters in a direction in which optical input power decreases, the first controller being connected to one of two outputs of the first cascade structure.

14 Claims, 32 Drawing Sheets

$$E_{o1} = r_1 E_{i1} + t_{21} E_{i2}$$
$$E_{o2} = t_{12} E_{i1} + r_2 E_{i2}$$

Phase Shifter $$E_{o1} = t_1(\omega, V_{c1})E_{i1}$$
$$E_{o2} = t_2(\omega, V_{c2})E_{i2}$$
$$arg \frac{t_1(\omega, V_{c1})}{t_2(\omega, V_{c2})} = \omega[\tau_1(V_{c1}) - \tau_2(V_{c2})]$$

CONTROL $V_{c1}, ..., V_{cN}$ TO
DECREASE (D) $P_i$

CONTROL $V_{c1}, ..., V_{cN}$ TO
INCREASE (I) $P_i$

FIG. 18
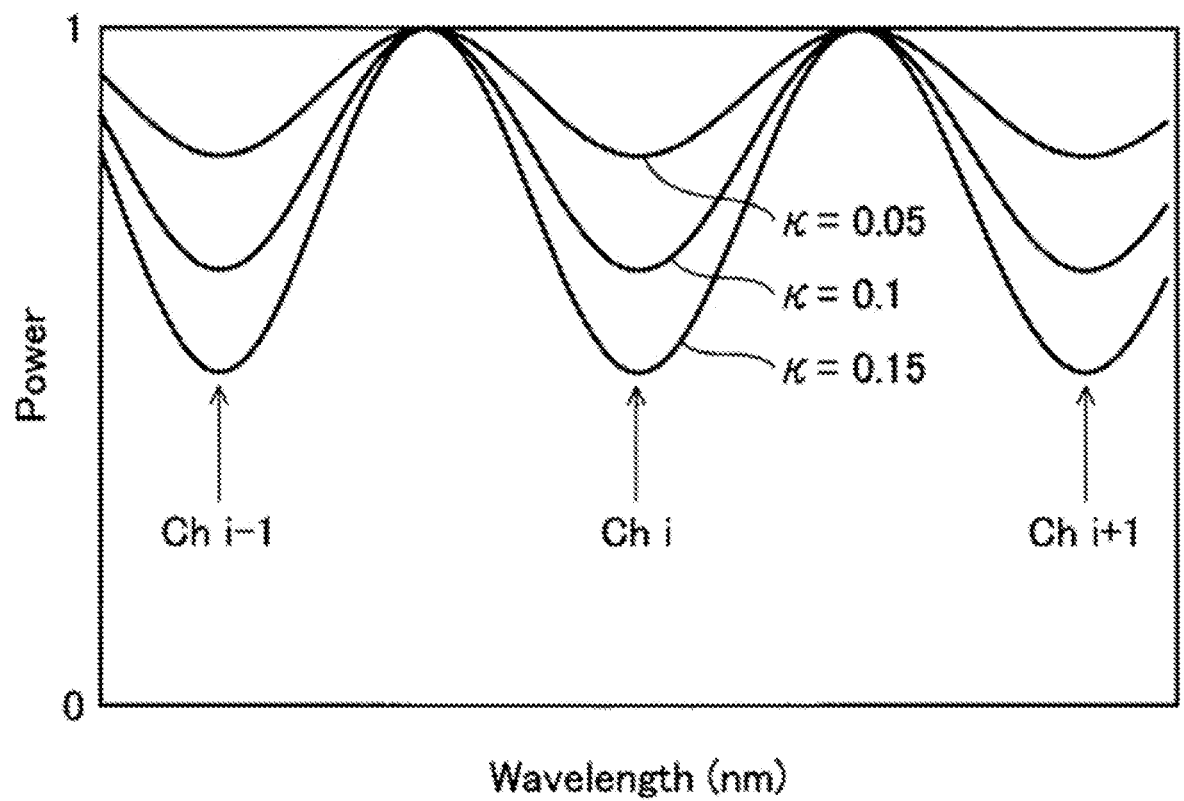
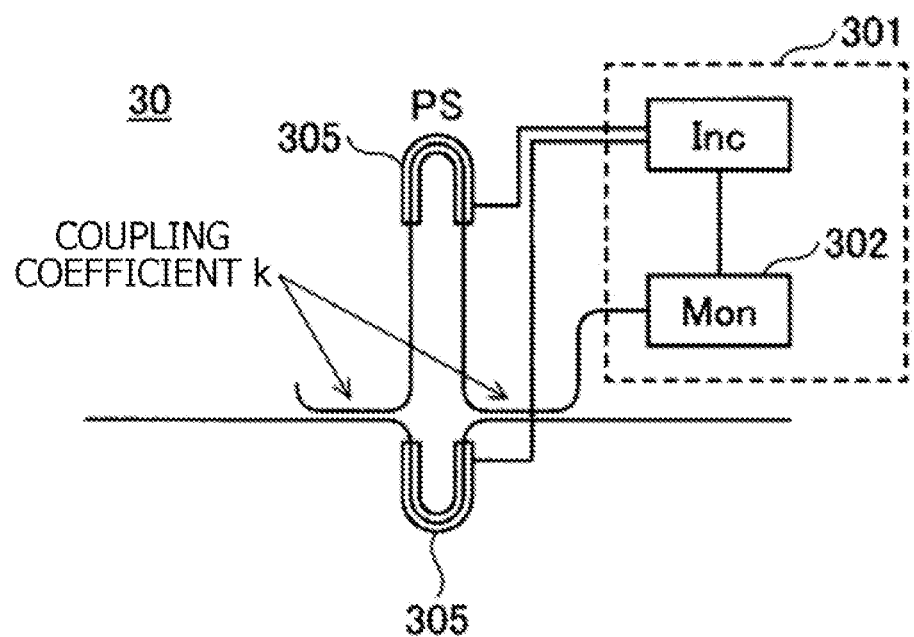

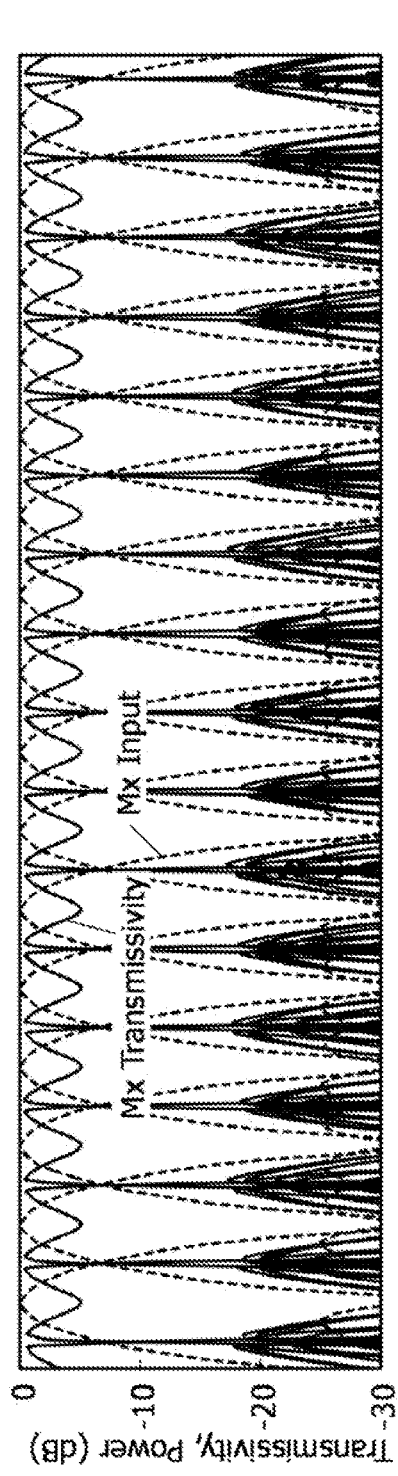
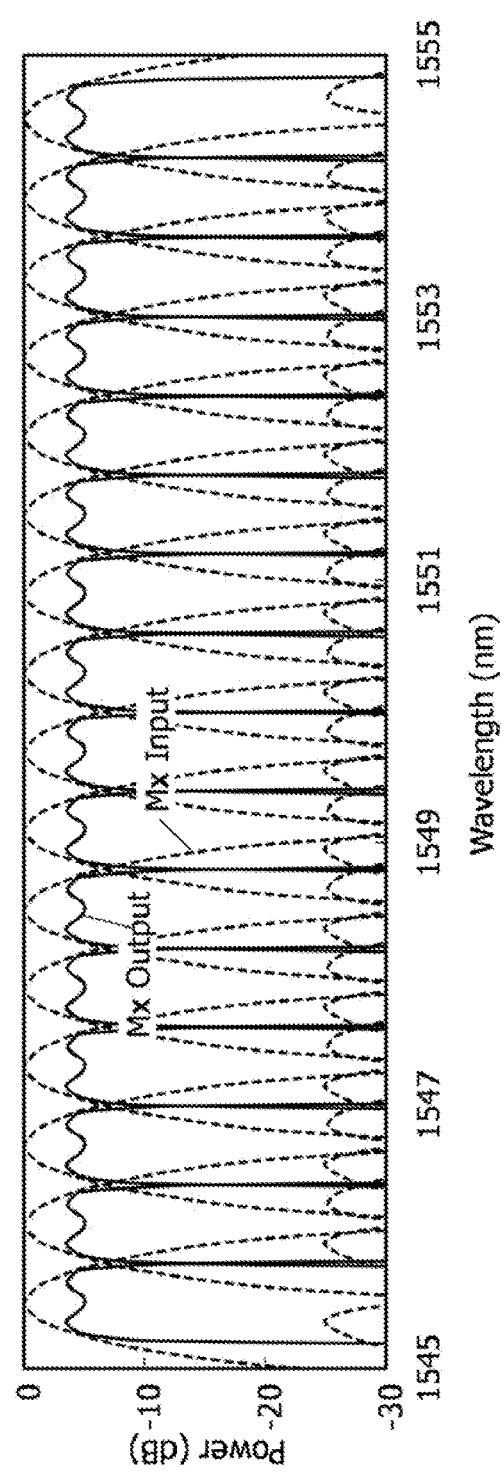
FIG. 30A
FIG. 30B

OPTICAL ELEMENT AND OPTICAL TRANSMITTER

CROSS-REFERENCE TO RELATED APPLICATION

This application is based upon and claims the benefit of priority of the prior Japanese Patent Application No. 2020-187728, filed on Nov. 11, 2020, the entire contents of which are incorporated herein by reference.

FIELD

The present disclosure relates to an optical element and an optical transmitter.

BACKGROUND

One of techniques for dealing with an increase in data communication volume is wavelength division multiplexing (WDM) in optical communication. In the WDM, a transmission rate per optical fiber is improved by multiplexing light of a plurality of wavelengths on one optical fiber. When converting a digital electrical signal into an optical signal, a WDM optical transmitter typically performs Nyquist shaping using a digital signal processor (DSP) to improve spectral efficiency and suppress crosstalk. The Nyquist shaping is a technique of performing sinc-function-type modulation to fit a modulated spectrum within a Nyquist frequency and shape the modulated spectrum into a rectangular pulse.

The Nyquist shaping using a DSP has high power consumption, which limits integration, miniaturization, and capacity enlargement of optical transmitters. A method of performing Nyquist filtering with an optical multiplexer/demultiplexer having an optical interferometer-type circuit has been proposed.

L. Zhuang et al., "*Nyquist-Filtering (De)Multiplexer Using a Ring Resonator Assisted Interferometer Circuit*", J. Lightwave Technol. 34. 1732 (2016) is disclosed as related art.

SUMMARY

According to an aspect of the embodiments, an a optical element including a plurality of first circuits, the optical element includes: a first cascade circuit in which one or more of first circuits included in the plurality of first circuits are connected in cascade; a second cascade circuit in which one or more of first circuits included in the plurality of first circuits are connected in cascade; and a combiner circuit configured to connect the first cascade circuit and the second cascade circuit, wherein a first circuit included in the plurality of first circuits includes: a first cascade structure in which N (N is an integer of 1 or larger) of 2-input and 2-output phase shifters and (N+1) of 2-input and 2-output couplers are alternately connected in cascade, and a first controller configured to control the N phase shifters in a direction in which optical input power decreases, the first controller being connected to one of two outputs of the first cascade structure.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 18 is a diagram illustrating an example of transmission characteristics according to the second unit circuit of the second embodiment;

FIG. 30A is a diagram illustrating an effect of an equalizer of the optical element of FIG. 29;

FIG. 30B is a diagram illustrating an effect of an equalizer of the optical element of FIG. 29.

DESCRIPTION OF EMBODIMENTS

In the related art, in the optical multiplexer/demultiplexer having an optical interferometer-type circuit, the spectrum does not work as designed due to an optical path length error, and crosstalk occurs between adjacent channels. Due to this crosstalk, optical elements that perform Nyquist shaping without using a DSP have not yet been put into practical use.

An object of the present disclosure is to provide an optical element that implements Nyquist shaping without using a DSP, and an optical transmitter using the optical element.

In an embodiment, power consumption is reduced by implementing Nyquist shaping with an optical element without using a DSP. Before describing a specific configuration of the embodiment, technical problems that occur in a known Nyquist filtering configuration will be described with reference to FIG. 1.

Figure 1:
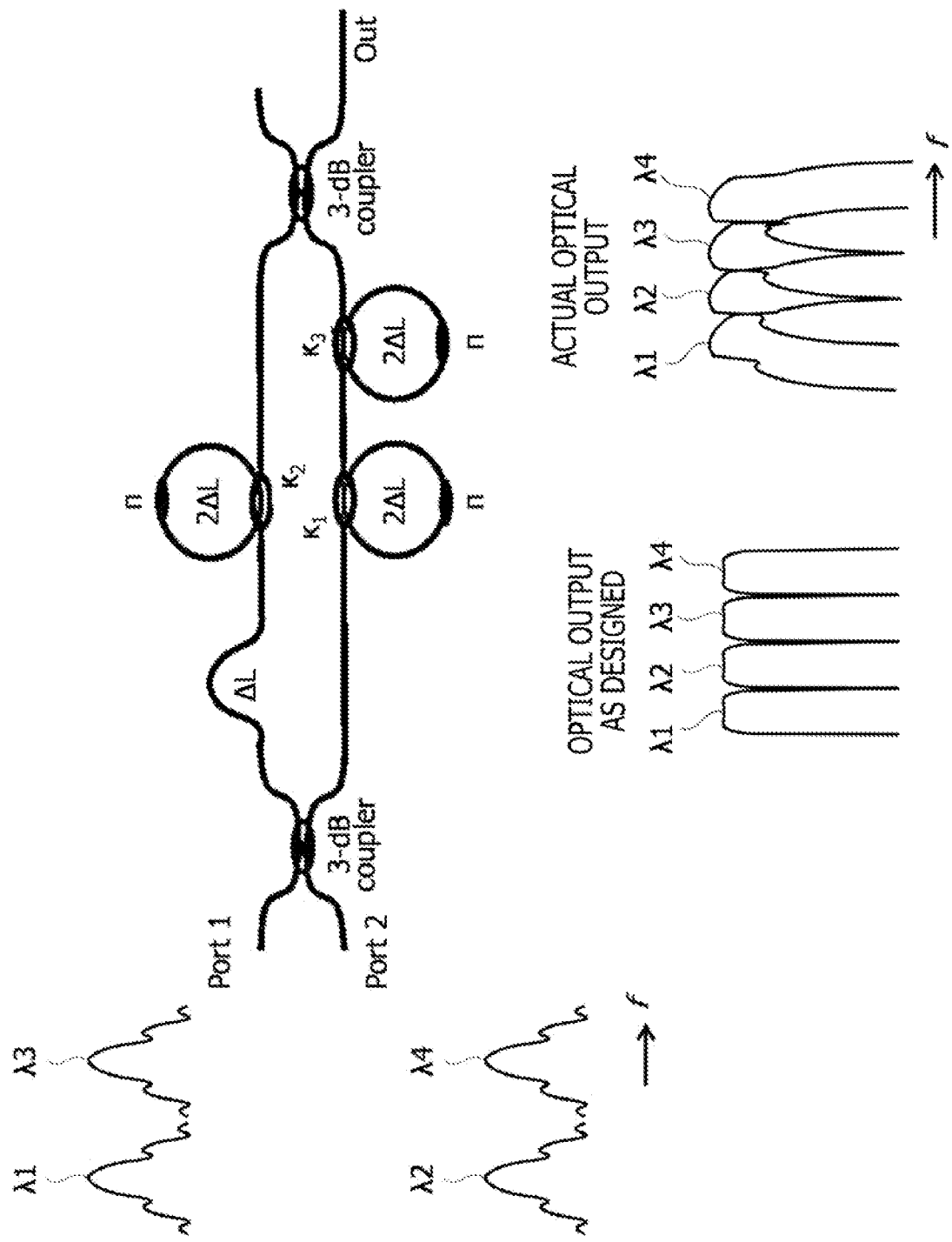
FIG. 1 is a diagram for specifically describing a technical problem of an interferometer-type Nyquist filtering optical multiplexer/demultiplexer.

A Nyquist filtering optical multiplexer/demultiplexer in FIG. 1 is formed using an asymmetric Mach-Zehnder (MZ) interferometer having a delay of ΔL in one waveguide. Nyquist shaping is performed using three ring resonators with a circumference of 2ΔL. The ring resonators placed (side-coupled) along the MZ interferometer function as an infinite impulse response filter.

If the optical multiplexer/demultiplexer is made as designed, when, for example, light of wavelengths λ1 to λ4 is input, four rectangular pulses shaped into a Nyquist band are obtained. However, in reality, the delay ΔL and an optical path length error in each ring resonator due to process error and the like, and it is difficult to obtain a spectrum as designed. In an actual optical output of the optical multiplexer/demultiplexer, spectra overlap and crosstalk occurs.

In the embodiment, the optical multiplexer/demultiplexer is formed using a passive optical circuit capable of automatically correcting the optical path length error to implement the Nyquist filtering without using a DSP and reduce the power consumption. In a favorable embodiment, an equalizer formed using a passive optical circuit is connected to an output of the optical multiplexer/demultiplexer and a more favorable rectangular pulse is generated.

Figure 2:
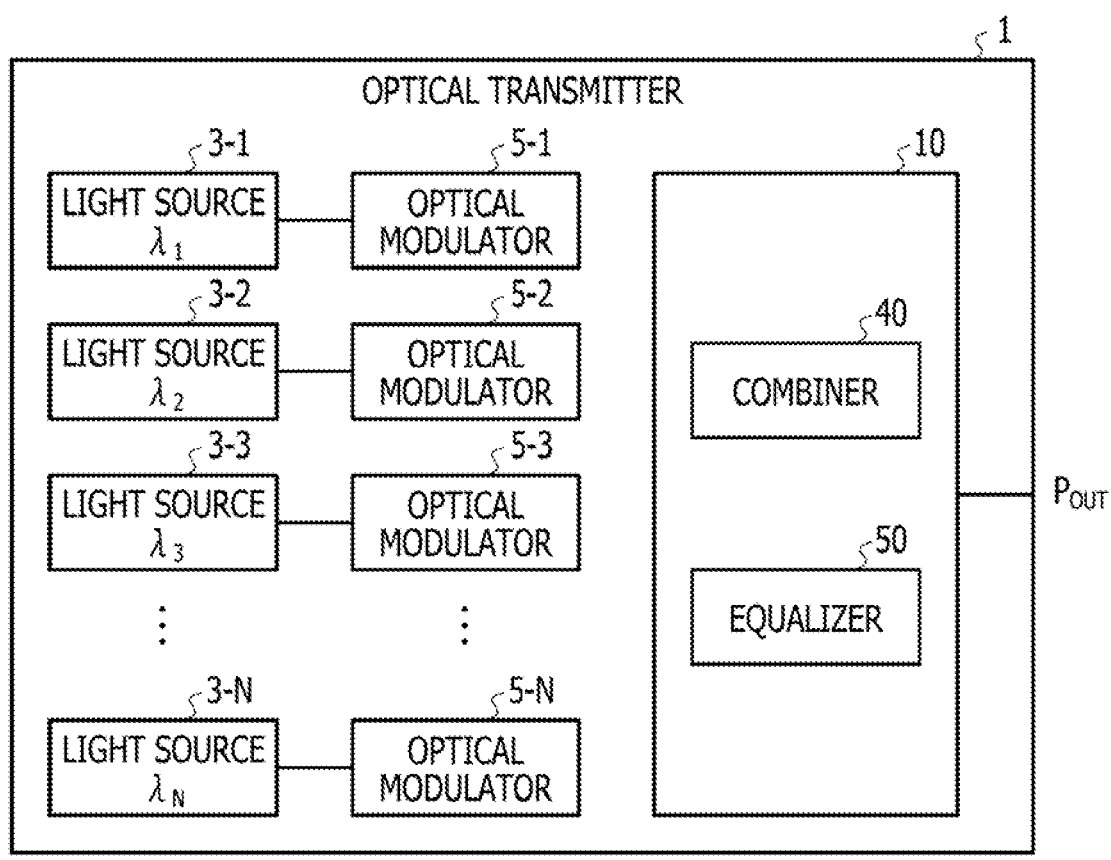
FIG. 2 is a schematic diagram of an optical transmitter using an optical element according to an embodiment.

FIG. 2 is a schematic diagram of an optical transmitter 1 to which an optical element 10 according to the embodiment is applied. The optical transmitter 1 includes a plurality of light sources 3-1 to 3-$n$ (appropriately, collectively referred to as "light source(s) 3"), optical modulators 5-1 to 5-$n$ (appropriately, collectively referred to as "optical modulator(s) 5") connected to the light sources 3-1 to 3-$n$, respectively, and an optical element 10 connected to outputs of the optical modulators 5-1 to 5-$n$.

Each of the plurality of light sources 3 emits light having a different wavelength. An analog drive signal generated on the basis of a digital data signal is input to the optical modulator 5, and the optical modulator 5 modulates the light of each wavelength incident on the optical modulator 5. A modulated light signal output from each optical modulator 5 is combined by a combiner 40 of the optical element 10.

The combiner 40 is a passive circuit formed using an optical waveguide, and pulse-shapes the modulated light signals having a plurality of waveguides into a Nyquist band and combines the signals. As will be described below, the combiner 40 has a filtering function and a function to correct or absorb the optical path length error, and performs pulse shaping in which overlap of spectra of input light signals is suppressed in the process of combining the optical modulated signals. In the case where the equalizer 50 is connected to an output of the combiner 40, the optical signal of each wavelength is shaped into a more favorable rectangular pulse.

The signal combined in the optical element 10 is output as a WDM signal through an output port POUT of the optical transmitter 1. A specific configuration of the optical element 10 will be described below. In the following description, the same components may be designated by the same reference numerals and duplicate description may be omitted.

First Embodiment: Basic Configuration

Figure 3:
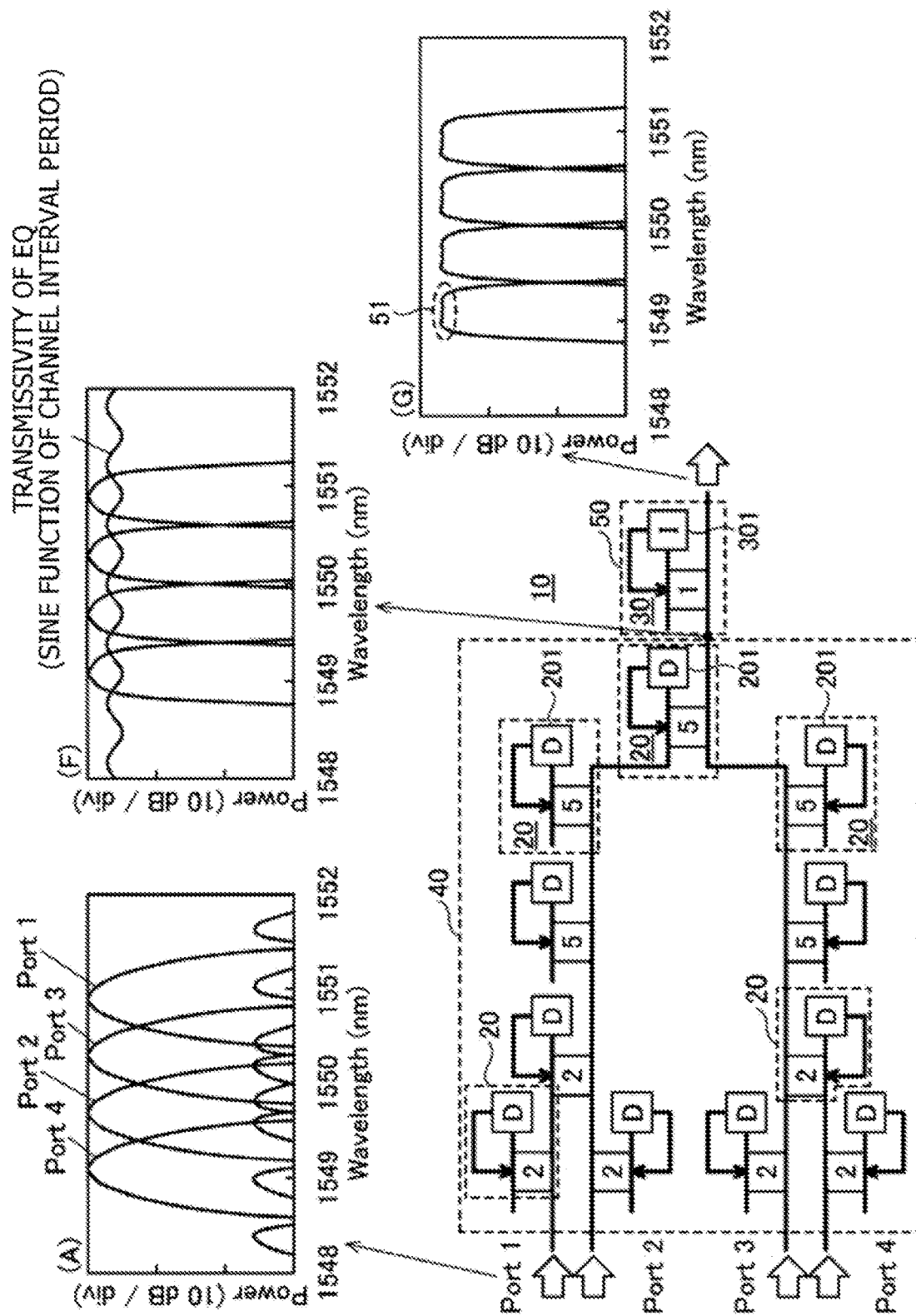
FIG. 3 is a diagram illustrating an optical element and a pulse shaping state according to a first embodiment.
Figure 4:
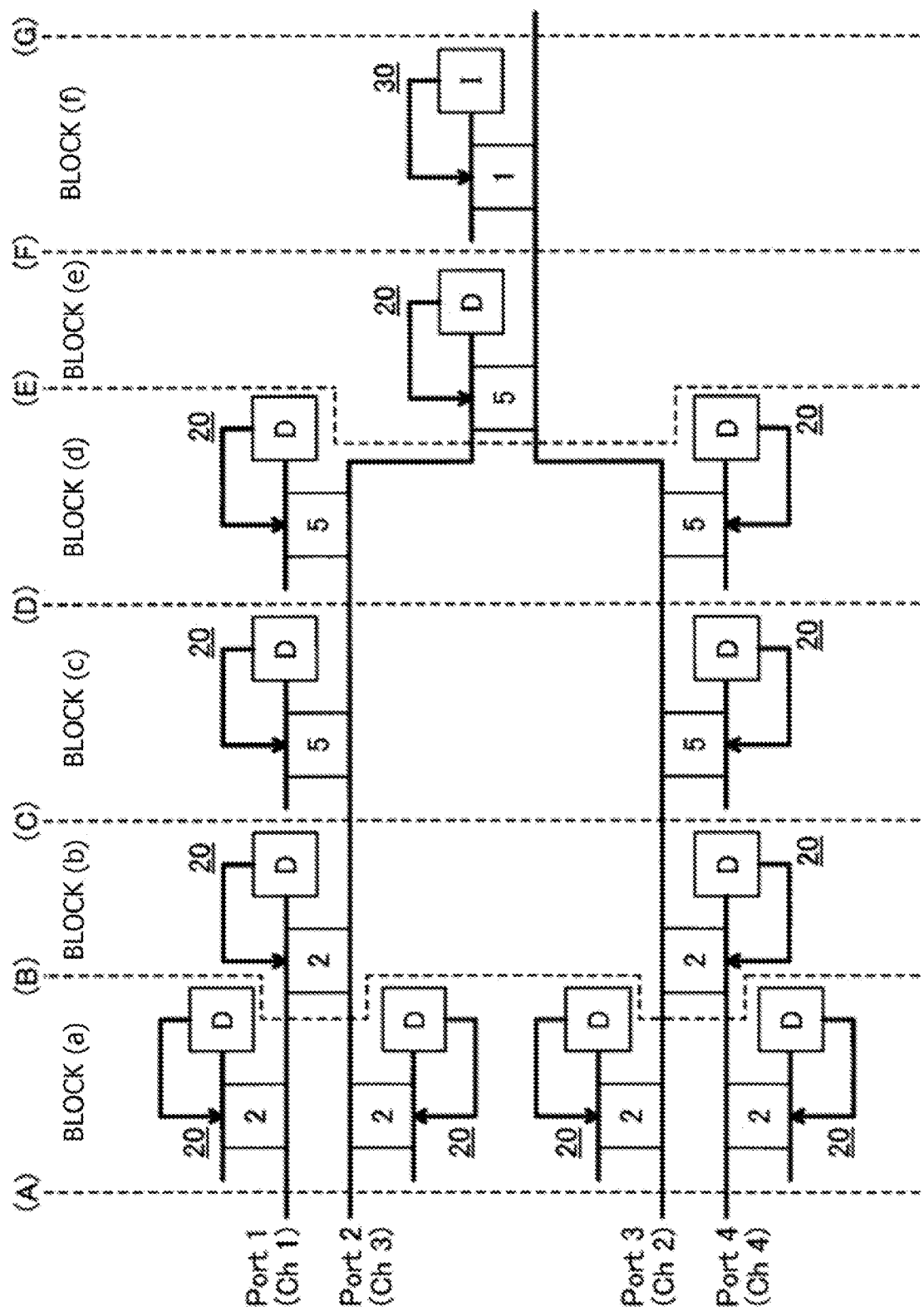
FIG. 4 is a diagram illustrating each block and a passing point constituting the optical element of FIG. 3.
Figure 5:
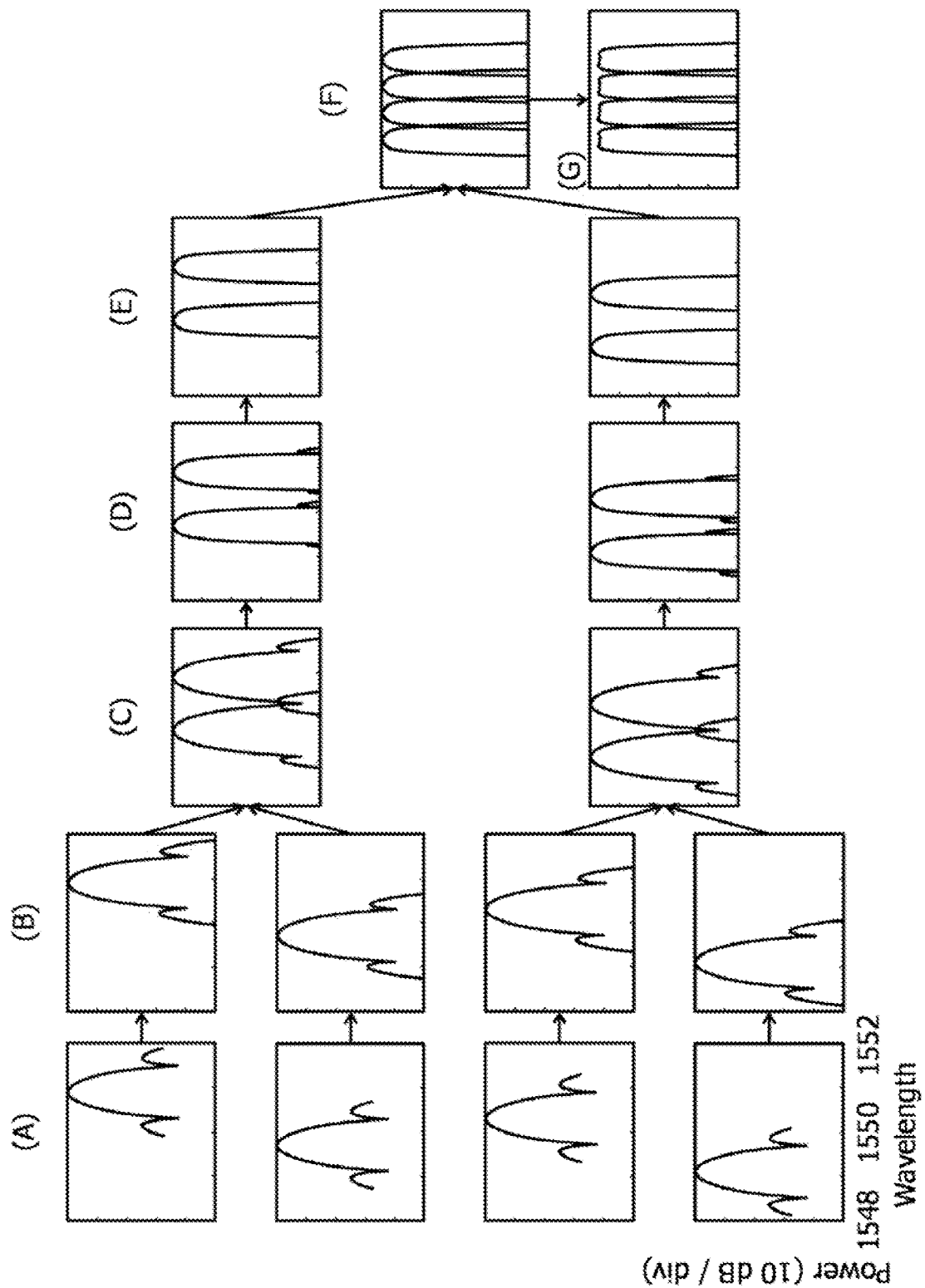
FIG. 5 is a diagram illustrating a power spectrum of each passing point in FIG. 4.
Figure 6:
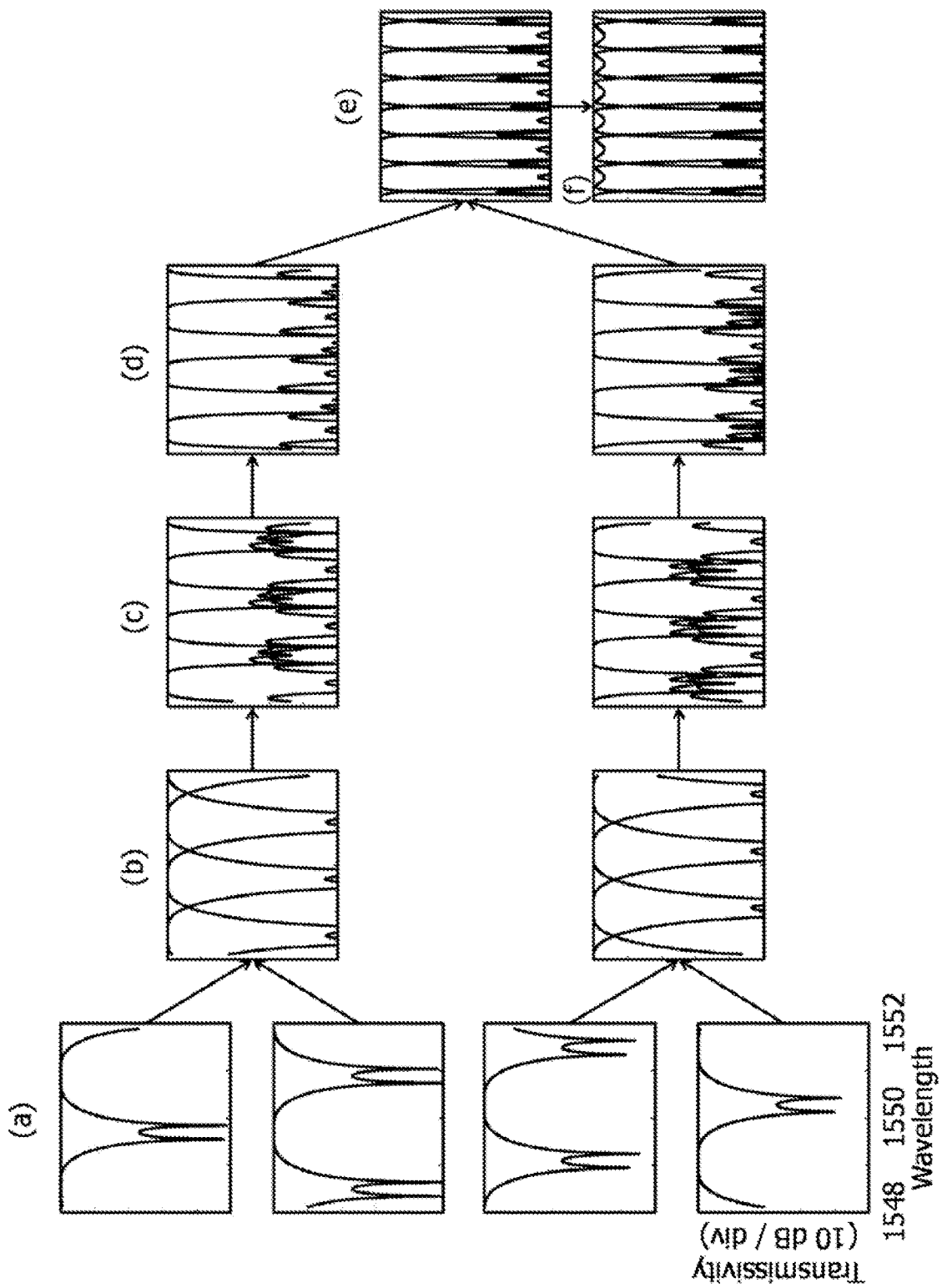
FIG. 6 is a diagram illustrating a power spectrum in each block of FIG. 4.

FIG. 3 is a diagram illustrating the optical element 10 according to the first embodiment and a pulse shaping state by the optical element 10, and FIG. 4 is a diagram illustrating each block and a passing point constituting the optical element 10 of FIG. 3. FIG. 5 illustrates a power spectrum of each passing point of FIG. 4, and FIG. 6 illustrates a power spectrum of each block of FIG. 4. The optical element 10 includes the combiner 40 having a plurality of input ports (for example, port 1 to port 4) and the equalizer 50 connected to the output of the combiner 40. The combiner 40 has a plurality of channels in which one or more first unit circuits 20 are connected in cascade. Each channel in which the first unit circuits are connected in cascade may be called a "cascade circuit". The plurality of channels is brought together by the first unit circuit 20 in the final stage of the combiner 40. An output of the first unit circuit 20 in the final stage of the combiner 40 is connected to an input of the equalizer 50 formed using a second unit circuit 30.

The first unit circuit 20 has a first controller 201 (denoted by "D" in the figure) that decreases (Decrease) power of input light, and one or more phase shifters controlled by the first controller. Since the first controller 201 performs control to decrease the input light power, the first controller 201 is referred to as a "D controller" in the following description. The number in the block of the first unit circuit 20 in the figure represent the number of phase shifters controlled by the D controller.

As illustrated in FIG. 4, the stages including the unit circuit are represented by blocks (a) to (f), and the passing points before and after the blocks are represented by (A) to (G) between an input stage and an output stage of the optical element 10. Power spectra at the passing points (A) to (G) are illustrated in FIG. 5, and power spectra of the blocks (a) to (f) are illustrated in FIG. 6.

For example, in an ITU frequency grid, the port 1 deals with the wavelength of channel 1 (denoted by "Ch" in the figure), the port 2 deals with the wavelength of channel 3, the port 3 deals with the wavelength of channel 2, and the port 4 deals with the wavelength of channel 4. Consider a case of combining these four wavelengths. The block (a) in FIG. 4 forms a filter that periodically transmits the optical signal input in the frequency grid at a period four times a grid interval, and suppresses crosstalk between the wavelength signals of the port 1 and the port 2, and crosstalk between the wavelength signals of the port 3 and the port 4. As a result, at the point (B), a filtered optical signal of each wavelength is obtained.

The block (b) forms a filter that periodically transmits the optical signals of the frequency grid at a period four times the grid interval, and combines the signals of different wavelengths of the channel 1 of the port 1 and the channel 3 of the port 2 while suppressing the crosstalk. Similarly, the block (b) combines the signals of different wavelengths of the channel 2 of the port 3 and the channel 4 of the port 4 while suppressing the crosstalk. As a result, at the point (C), the power spectrum including the signals of the channel 1 and the channel 3 and the power spectrum including the signals of the channel 2 and the channel 4 are obtained.

The block (c) forms a filter that periodically transmits the optical signal of the frequency grid at a period twice the grid interval, and performs Nyquist filtering by cutting off a sidelobe of the signal. The larger the number of phase shifters included in the first unit circuit 20, the steeper the slope of the spectrum can be obtained, but there is a problem of an increase in heater power consumption, which trade off. In the example of FIG. 4, the first unit circuit 20 of the block (c) has five phase shifters. As a result, a steep slope spectrum is obtained at the point (D).

The block (d) forms a transmission filter that transmits the input light at a period twice the grid interval and performs the Nyquist filtering, similarly to the block (c). Here, the reason why the block (c) and the block (d) are not controlled by one D controller is that when ten phase shifters are controlled by one D controller, the slope can be made steep but obtainment of an effect of narrowing a transmission band becomes difficult, and the crosstalk remains. To obtain the effect of narrowing a bandwidth and reducing the crosstalk, two first unit circuits 20 each including five phase shifters are connected in cascade. As a result, the slope of the signal becomes steeper at the point (E), and a power spectrum shaped in a narrow band can be obtained.

The block (e) performs the Nyquist filtering by cutting off the sidelobe, and combines even and odd channels as an interleaver. As a result, a power spectrum in which the four channels are combined is obtained at the point (F).

The block (f) is formed using the second unit circuit 30, and flattens a peak of each signal to obtain a rectangular signal. The second unit circuit 30 has a second controller 301 (denoted by "I" in the figure) that increases (Increase) the power of the input light, and one or more phase shifters controlled by the second controller 301. Since the second controller 301 performs control to increase the input light power, the second controller 301 is referred to as an "I controller" in the following description. The number in the block of the second unit circuit 30 in the figure represent the number of phase shifters controlled by the I controller.

In this way, at the point (A) serving as the input ports (port 1 to port 4) of the optical element 10, the optical signals of the wavelengths have sidelobes, and the main lobes overlap each other at a point where a gain drops by 3 dB. At the point (F) where the optical signals have been transmitted through the combiner 40, the optical signals of the wavelengths are shaped into the Nyquist band, and the overlap between the optical signals is reduced. The power spectrum in the Nyquist band with suppressed crosstalk can be obtained by the combiner 40, but the optical power of each channel has a convex peak. At the point (G), by causing the power spectrum to pass through the equalizer 50, a power spectrum shaped into a rectangular pulse with flattened peaks is obtained.

The equalizer 50 has transmissivity that changes sinusoidally at the same period as the channel interval. By causing the power spectrum B to pass through the equalizer 50 in the subsequent stage, an effect similar to the effect of applying a sine function of a channel interval period can be obtained. The transmissivity of the equalizer 50 changes sinusoidally so that the valley of the transmissivity matches the peak of the optical power of each channel. The reason why near a center of an upper end 51 of each rectangular pulse is slightly recessed at the point (G) is that the valley of the transmissivity of the equalizer 50 corresponds to the peak of the input power.

The optical signals input through the input port 1 to port 4 are combined by the combiner 40 of the optical element 10, thereby being shaped into the Nyquist band with crosstalk suppressed. By using the equalizer 50, the combined optical signal is shaped into a rectangular pulse with a more favorable shape.

Figure 7:
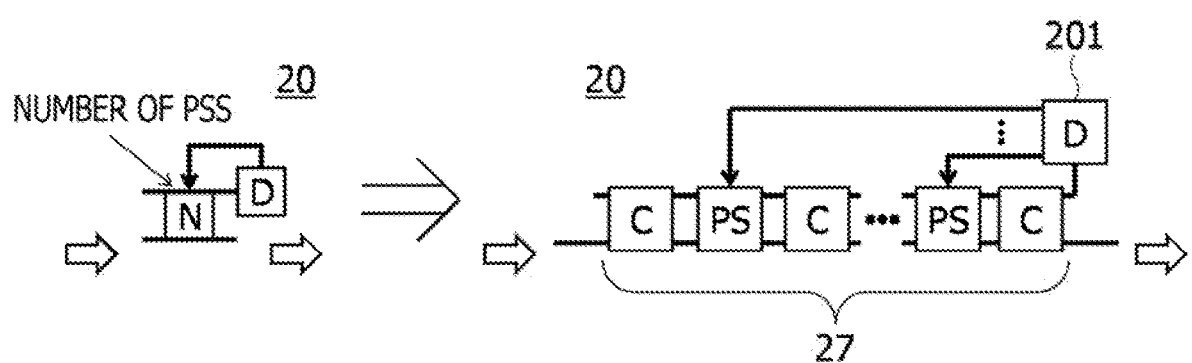
FIG. 7 is a diagram illustrating a configuration example of a first unit circuit having a decrease (D) controller that decreases input light power.

FIG. 7 illustrates a configuration example of the first unit circuit 20. The first unit circuit 20 includes the D controller 201, N phase shifters PS electrically connected to the D controller 201 (N is an integer of 1 or larger), and a coupler C arranged between adjacent phase shifters PS. The phase shifter PS and the coupler C are connected in cascade to form a first cascade structure 27. Assuming that the number of phase shifters PS included in the first unit circuit is N, the D controller 201 has one optical input and N or more electrical outputs.

The coupler C is a 2-input and 2-output coupler. In the example of FIG. 7, one output of the coupler C in the final stage is connected to the optical input of the D controller 201. Each phase shifter PS has 2 inputs and 2 outputs. The phase shifter PS has no port-to-port coupling, and a phase relationship between the ports changes according to the electrical signal from the controller 201. As will be described below with reference to FIG. 11, the number of electrical signals input from the D controller 201 to one phase shifter PS is not limited to one, so in the configuration having N phase shifters PS, there are N or more electrical Inputs for the N phase shifters PS. The D controller 201 changes an electrical signal output such that the optical input power is reduced.

In the present specification and claims, "first unit circuit 20" refers to a structure in which, regardless of the number of phase shifters PS, one of two outputs of the first cascade structure 27 having N phase shifters PS and (N+1) couplers C (N is a natural number) that are alternately connected in cascade serves as the optical input of the D controller 201, and the electrical output of the D controller serves as the electrical input of each phase shifter PS.

Figure 8:
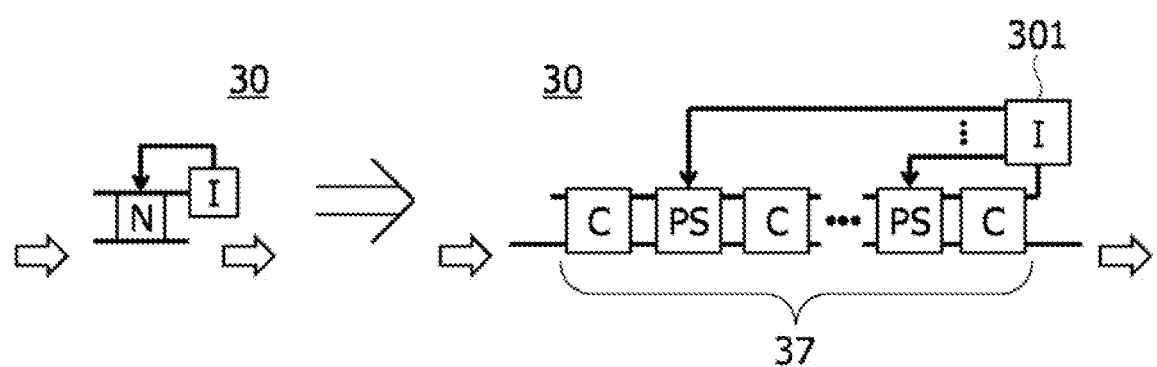
FIG. 8 is a diagram illustrating a configuration example of a second unit circuit having an increase (I) controller that increases input light power.

FIG. 8 illustrates a configuration example of the second unit circuit 30. The second unit circuit 30 has a configuration in which the D controller 201 of the first unit circuit 20 is replaced with the I controller 301. The second unit circuit 30 includes the I controller 301, N phase shifters PS electrically connected to the I controller 301 (N is an integer of 1 or larger), and a coupler C arranged between adjacent phase shifters PS. Values of N in the first unit circuit 20 and in the second unit circuit 30 may be different or the same. In the present specification and claims, the phase shifter PS of the second unit circuit 30 may be referred to as a "second phase shifter" to be distinguished from the phase shifter PS of the first unit circuit 20. Similarly, the coupler C of the second unit circuit 30 may be referred to as a "second coupler" to be distinguished from the coupler C of the first unit circuit 20. The second phase shifter PS and the second coupler C are connected in cascade to form a second cascade structure 37.

When the N phase shifters PS are used in the second unit circuit 30, the I controller 301 has one optical input and N or more electrical outputs. The coupler C is a 2-input and 2-output coupler, and in the example of FIG. 8, one output of the coupler C in the final stage is connected to the optical input of the I controller 301. Each phase shifter PS of the second unit circuit 30 has no port-to-port coupling, and a phase relationship between the ports of the phase shifters PS changes according to the electrical signal from the I controller 301. The number of electrical signals input from the I controller 301 to one phase shifter PS is not limited to one, so in the configuration having N phase shifters PS, there are N or more electrical inputs for the N phase shifters. The I controller 301 changes an electrical signal output to each phase shifter PS such that the optical input power increases.

In the present specification and claims, a structure in which one of two outputs of the second cascade structure 37 in which N (N is a natural number) phase shifters PS and (N+1) couplers C are alternately connected in cascade serves as an optical input of the I controller 301, and an electrical output of the I controller serves as an electrical input of each phase shifter PS, regardless of the number of second phase shifters, is called "second unit circuit 30".

Figure 9A:
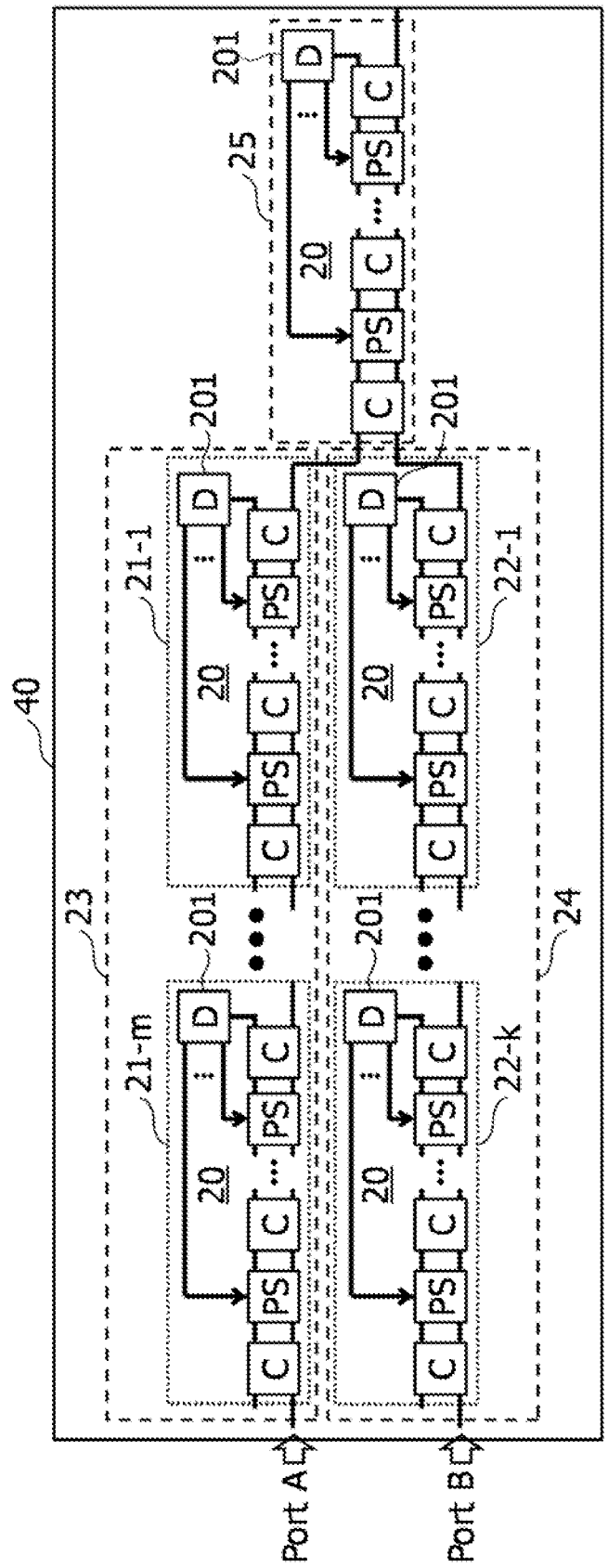
FIG. 9A is a schematic diagram of an optical multiplexer/demultiplexer in which a plurality of the first unit circuits is connected.

FIG. 9A is a schematic diagram of the combiner 40 in which the first unit circuits 20 of FIG. 7 are connected in cascade. The combiner 40 has a first cascade circuit 23 in which one or more first unit circuits 20 are connected in cascade, and a second cascade circuit 24 in which one or more first unit circuits 20 are connected in cascade. In this example, the first cascade circuit 23 is connected to the port A and the second cascade circuit 24 is connected to the port B.

The first cascade circuit 23 and the second cascade circuit 24 are coupled by a combiner circuit 25 in the final stage in a propagation direction. The combiner circuit 25 is formed using the first unit circuit 20 arranged in the final stage of the combiner 40. The first cascade circuits 23 has one or more filter circuits 21-1 to 21-$m$ ($m$ is an integer of 1 or larger) each formed using the first unit circuit 20. The second cascade circuit 24 has one or more filter circuits 22-1 to 22-$k$ ($k$ is an integer of 1 or larger) each formed using the first unit circuit 20.

The number of the first unit circuits 20 included in the first cascade circuit 23 and the number of the first unit circuits 20 included in the second cascade circuit 24 may be the same or different. In the first cascade circuit 23, the second cascade circuit 24, and the combiner circuit 25, the number N of the phase shifter PS included in the first unit circuit 20 may be the same or different.

The output of the first cascade circuit 23 is connected to one input of the coupler C at an input end of the combiner circuit 25. The output of the second cascade circuit 24 is connected to another input of the coupler C at the input end of the combiner circuit 25.

In the first unit circuit 20 forming the combiner circuit 25, one output of the coupler C in the final stage is connected to the D controller 201, and another output becomes an input to the next stage.

Figure 9B:
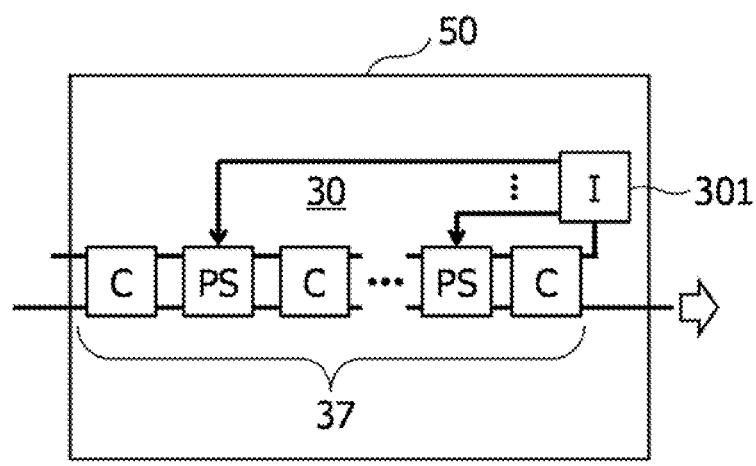
FIG. 9B is a schematic diagram of a second unit circuit constituting an equalizer connected to the optical multiplexer/demultiplexer.

FIG. 9B is a schematic diagram of the equalizer 50 formed using the second unit circuit 30 of FIG. 8. The output of the combiner 40 of FIG. 9A, that is, the output of the combiner circuit 25, is connected to one input of the coupler C at the input end of the equalizer 50. The phase relationship between two outputs is controlled by the I controller for the one or more phase shifters PS connected in cascade to the coupler C at the input end. The control of the phase shifter PS by the I controller is control of adjusting the valley of the transmissivity of the equalizer 50, which changes sinusoidally, to the peak of the output power spectrum of the combiner 40.

Figure 10:
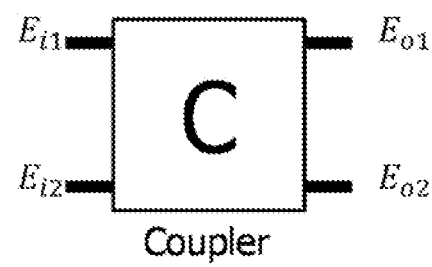
FIG. 10 is an explanatory diagram of a 2-input and 2-output coupler used in a unit circuit.

FIG. 10 is a schematic diagram of the coupler C used in the first unit circuit 20 and the second unit circuit 30. The coupler C has two inputs Ei1 and Ei2 and two outputs Eo1 and Eo2. The outputs Eo1 and Eo2 are expressed as:

$Eo1 = r1Ei1 + t21Ei2$, and $Eo2 = t12Ei1 + r2Ei2$ using a reflection coefficient r and a transmission coefficient t.

Figure 11:
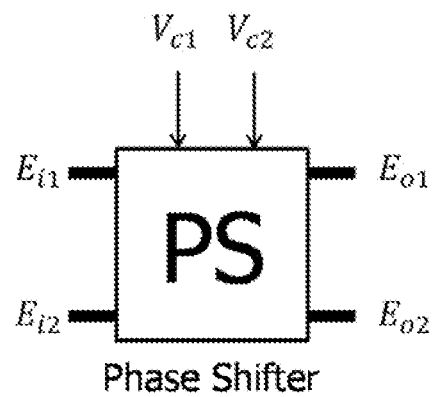
FIG. 11 is an explanatory diagram of a 2-input and 2-output phase shifter used in a unit circuit.

FIG. 11 is a schematic diagram of the phase shifter PS used in the first unit circuit 20 and the second unit circuit 30. The phase shifter PS has two optical inputs Ei1 and Ei2, two electrical inputs Vc1 and Vc2, and two optical outputs Eo1 and Eo2. The optical outputs Eo1 and Eo2 of the phase shifter PS are respectively expressed as:

$Eo1 = t1(\omega, Vc1)Ei1$, and $Eo2 = t2(\omega, Vc2)Ei2$ as functions of an angular frequency ω and the electrical inputs Vc1 and Vc2 of the input signal, and a declination, that is, the phase between the two output ports is expressed as:

$\arg[t1(\omega, Vc1)/t2(\omega, Vc2)] = \omega[\tau1(Vc1) - \tau2(Vc2)]$. Here, t1 and t2 are the transmissivity to the two output ports, and τ1 and τ2 are time.

Figure 12A:
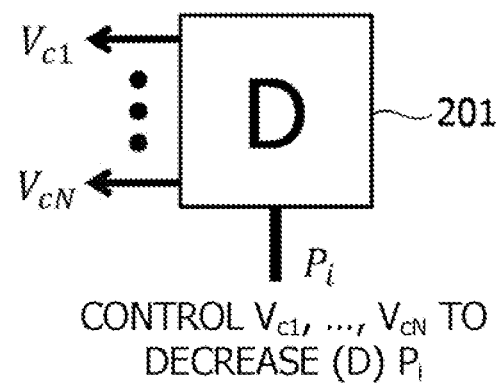
FIG. 12A is an explanatory diagram of a D controller having one optical input port and one or more electrical output ports.

FIG. 12A is a schematic diagram of the D controller 201 used in the first unit circuit 20. In this example, the D controller 201 has one optical input Pi and N electrical outputs Vc1 to VcN. The electrical outputs Vc1 to VcN are input to the corresponding phase shifters PS. At least some of the electrical outputs Vc1 to VcN may contain one or more electrical signals. The D controller 201 controls the electrical outputs Vc1 to VcN such that the power of the optical input Pi decreases.

Figure 12B:
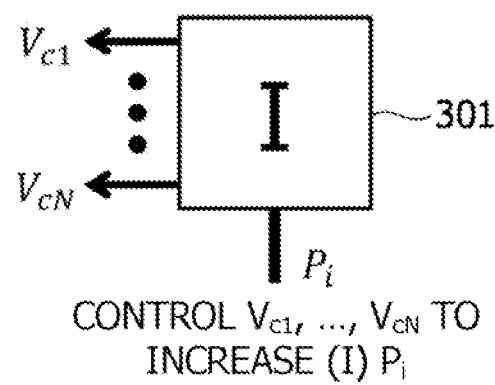
FIG. 12B is an explanatory diagram of an I controller having one optical input port and one or more electrical output ports.

FIG. 12B is a schematic diagram of the I controller 301 used in the second unit circuit 30. The I controller 301 has one optical input Pi and N electrical outputs Vc1 to VcN. The electrical outputs Vc1 to VcN are connected to the inputs of the corresponding phase shifters PS. At least some of the electrical outputs Vc1 to VcN may contain one or more electrical signals. The I controller 301 controls the electrical outputs Vc1 to VcN such that the power of the optical input Pi increases.

Figure 13:
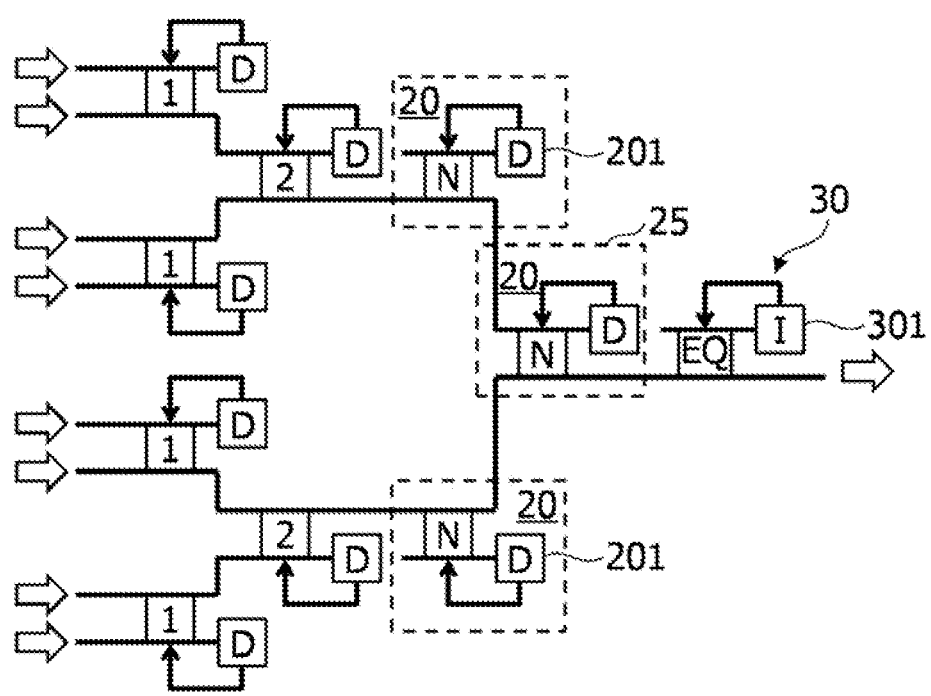
FIG. 13 is a model circuit diagram used for confirming the effect of connecting N phase shifters in cascade in the first unit circuit.
Figure 14:
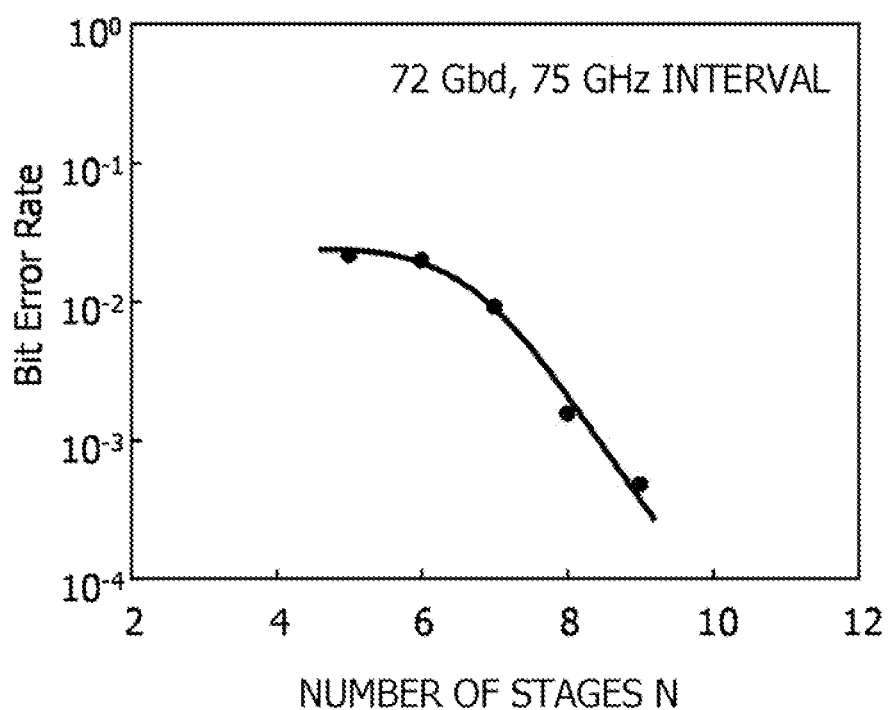
FIG. 14 is a diagram illustrating a result of effect confirmation calculated by a model circuit of FIG. 10.

FIG. 13 is a model circuit diagram used for confirming the effect of connecting the N phase shifters PS in the first unit circuit 20 having the D controller 201, and FIG. 14 is a diagram illustrating a result of the effect confirmation. In the model circuit of FIG. 13, the number of phase shifters PS of the first unit circuit 20 in the input stage of the combiner 40 with eight input ports is one, and the number of phase shifters PS of the first unit circuit 20 in the second stage is two. The numbers of phase shifters PS of the first unit circuit 20 in the third stage and of the first unit circuit 20 forming the combiner circuit 25 are set to N, and a bit error rates are calculated while changing the value of N. The blocks denoted by "D" in the figure all represent D controllers 201. The output of combiner circuit 25 is connected to the input of the second unit circuit 30 having the I controller 301.

The horizontal axis of FIG. 14 represents the number N of the phase shifters PS of the first unit circuit 20, and the vertical axis represents the bit error rate. The bit error rate is calculated assuming that a baud rate is 72 Gbd and the channel interval is 75 GHz. It can be seen that, in the first unit circuit 20, the bit error rate sharply decreases and the crosstalk is improved as the number N of the phase shifters PS connected in cascade is increased. In the above-described condition, the number N of the first unit circuits in the final stage of the cascade circuit and the combiner circuit is five to ten, more favorably seven to ten. The crosstalk decreases by increasing the number of phase shifters PS and making the shape of the transmission spectrum closer to a rectangle. In relation to control capability of the controller, the number N may be set to a range in which a narrow band, that is, a crosstalk reduction effect can be sufficiently obtained, for example, five to eight.

Under a condition where the baud rate is lower than 72 Gbd, it is expected to obtain a similar effect to FIG. 14 even if the value of N is smaller than that in FIG. 14. In digital coherent optical communication, it is desirable that the optical filter also has a wavelength variable function in order to support the C band from the shortest wavelength to the longest wavelength. As will be described below, the optical element 10 can be provided with the wavelength variable function by providing a heater or the like on the phase shifter PS to control the temperature.

Second Embodiment: Waveguide Configuration

Figure 15:
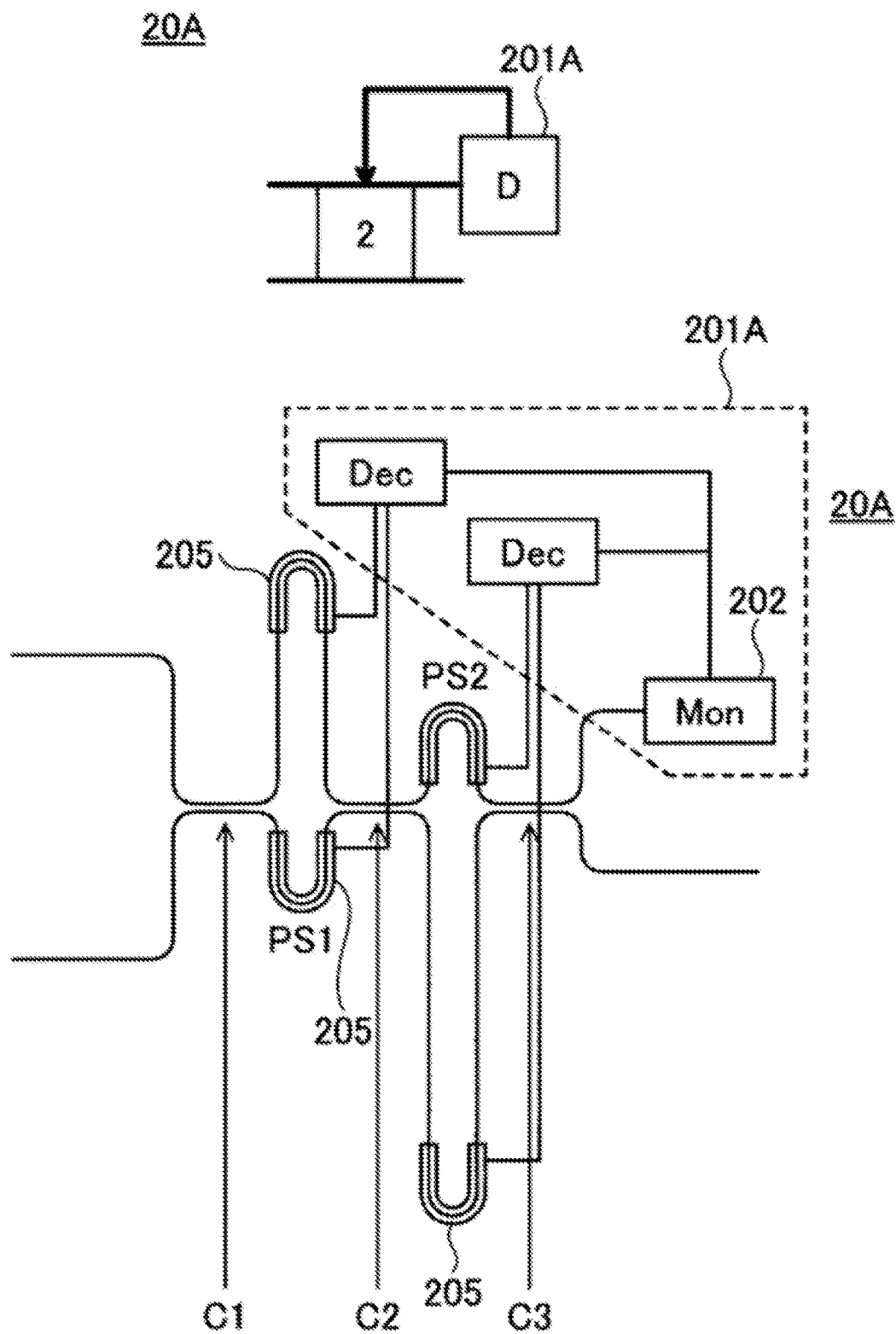
FIG. 15 is a diagram illustrating a configuration example of a first unit circuit according to a second embodiment.
Figure 16:
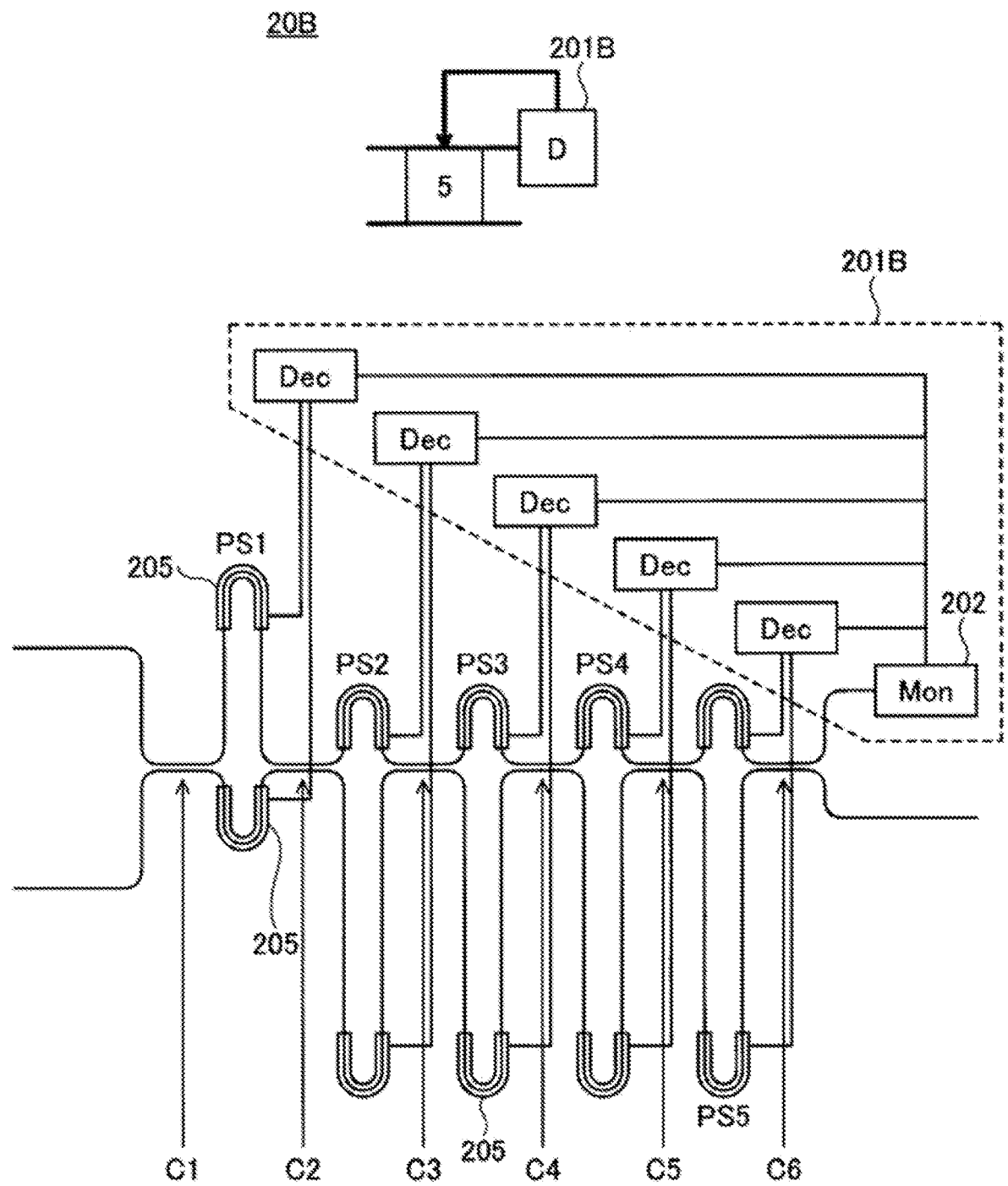
FIG. 16 is a diagram illustrating another configuration example of the first unit circuit according to the second embodiment.
Figure 17:
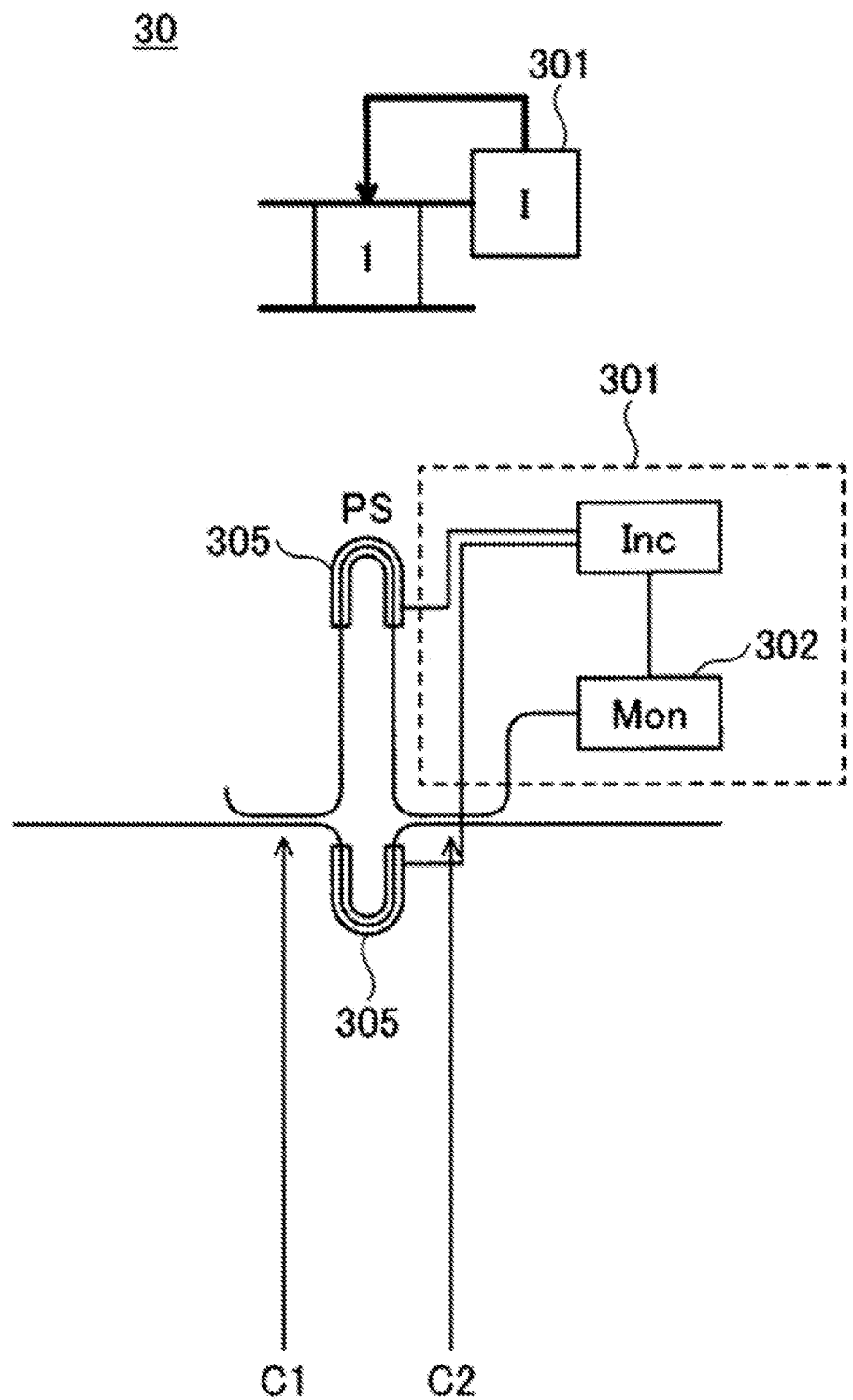
FIG. 17 is a diagram illustrating a configuration example of a second unit circuit according to the second embodiment.

FIGS. 15 and 16 are specific configuration diagrams of first unit circuits 20 of a second embodiment, and FIG. 17 is a specific configuration diagram of a second unit circuit 30. In a first unit circuit 20A of FIG. 15, the number of phase shifters PS connected to a D controller 201A is two. In a first unit circuit 20B of FIG. 16, the number of phase shifters PS connected to a D controller 201B is five.

In FIG. 15, each phase shifter PS is formed using an asymmetric MZ interferometer, and a heater 205 is provided in each optical waveguide constituting the asymmetric MZ interferometer. For temperature control, it is inefficient to heat both of the two optical waveguides that form the asymmetric MZ interferometer because an optical path length becomes long as the optical waveguide is warmed, and the heater of either an upper arm or a lower arm may be warmed to adjust the optical path length.

Power branch ratios of a coupler C1 on an input side of a phase shifter PS1 are 0.5 and 0.5. In a coupler C2, the power branch ratio to the shorter optical waveguide is 0.24. In a coupler C3, the power branch ratio to the optical waveguide connected to the D controller 201A is 0.24.

The D controller 201A has one optical input and two electrical outputs. At least one of two electrical signals may contain a pair of electrical signals. An optical input of the D controller 201A is one output of the coupler C3. The D controller 201A has a power monitor 202 and monitors the power of light input from the coupler C3. A monitor result of the power monitor 202 is supplied to a decrease circuit Dec provided corresponding to the number of phase shifters PS. The decrease circuit Dec changes a level of the electrical signal that controls the heater 205 in a direction in which the optical input power decreases, on the basis of the monitor result. In this example, a pair of electric signals is output from each decrease circuit Dec, but as described above, when the heater of one of two arms of the phase shifter PS is controlled, one electrical signal may be output from the decrease circuit Dec. By controlling the temperature of the heater 205, an effective optical path length difference between the two optical waveguides can be brought close to a design value.

The first unit circuit 20B in FIG. 16 is the same as the first unit circuit 20A in FIG. 15, except that the number of phase shifters PS and the number of decrease circuits Dec are increased. The power branch ratios of the coupler C1 are 0.5 and 0.5. The power branch ratio of the coupler C2 to the shorter optical waveguide is 0.24. The power branch ratio of the coupler C3 to the shorter optical waveguide is 0.24. The power branch ratio of a coupler C4 to the shorter optical waveguide is 0.09. The power branch ratio of a coupler C5 to the shorter optical waveguide is 0.054. The power branch ratio of a coupler C6 to the power monitor 202 is 0.03.

The heater 205 is provided in the optical waveguide for each of the phase shifters PS1 to PS5. The D controller 201B has one optical input and five electrical outputs. At least some of the five electrical outputs may contain a pair of electrical signals. The optical input of the D controller 201B is one output of the coupler C6. The monitor result of the power monitor 202 is supplied to the five decrease circuits Dec. The decrease circuit Dec changes the level of the electrical signal that controls the heater 205 of the corresponding phase shifter PS in the direction in which the optical input power decreases, on the basis of the monitor result.

By controlling the temperature of the phase shifter PS, an optical path length error can be absorbed and an optical element 10 can have a wavelength variable function. The optical path length error is corrected over an entire C band, and Nyquist shaping with less crosstalk is implemented.

In FIG. 17, the second unit circuit 30 has one phase shifter PS and an I controller 301. A heater 305 is provided in each optical waveguide of the phase shifter PS. The I controller 301 has a power monitor 302 and an increase circuit Inc that controls the heater 305 of the phase shifter PS. The power branch ratio to the shorter optical waveguide of the coupler C1 on the input side of the phase shifter PS1 is 0.15. In the coupler C2, the power branch ratio to the power monitor 302 is 0.15.

The I controller 301 has one optical input and one electrical output containing a pair of electrical signals. An optical input of the I controller 301 is one output of the coupler C2. A monitor result of the power monitor 302 is supplied to the increase circuit Inc. The increase circuit Inc changes the level of the electrical signal for controlling the heater 305 in the direction in which the optical input power increases on the basis of the monitor result. As described above, the number of electrical signals that control the heater 305 of the phase shifter may be one.

FIG. 18 illustrates characteristics of an equalizer 50 configured by the second unit circuit 30. By changing a coupling coefficient k of the coupler C1 and the coupler C2, the degree (amplitude) of a change in transmissivity that sinusoidally changes can be adjusted. When increasing the coupling coefficient k to 0.05, 0.1, and 0.15, the amplitude of the change in power (or transmissivity) that periodically changes at a channel interval, but the position corresponding to a valley of the change is a center frequency of each channel. By controlling the heater temperature of each phase shifter PS, the valley of the change in transmissivity can be adjusted to a peak of an input light signal of each channel.

By giving the equalizer 50 the transmission characteristics illustrated in FIG. 18, the peak of the optical waveform of each channel included in the optical signal to be input to the equalizer 50 is flattened, a shape closer to the shape of an ideal rectangular pulse is obtained, and spectral efficiency can be improved.

Third Embodiment: Control of First Unit Circuit

Figure 19:
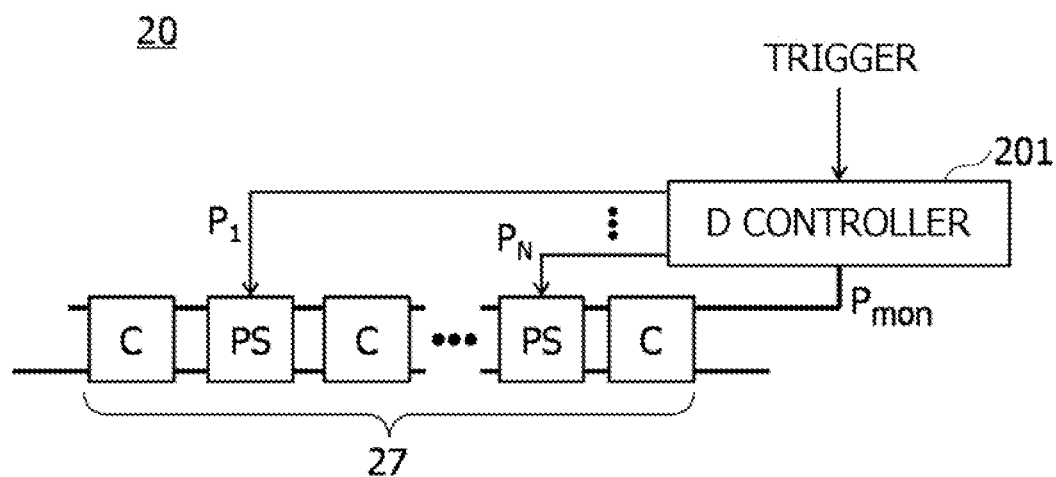
FIG. 19 is a diagram for describing a control configuration of a first unit circuit according to a third embodiment.

FIG. 19 is a diagram for describing a control configuration of a first unit circuit 20. As described in the first embodiment and the second embodiment, the first unit circuit 20 has a first cascade structure 27 including one or more phase shifters PS connected in cascade by a coupler C, and a D controller 201. The D controller 201 starts waveform shaping and control of each phase shifter PS upon an input of a trigger signal. The trigger signal may be input from, for example, a logic device, a microprocessor, or the like provided in a package in which an optical transmitter 1 is housed.

Figure 20:
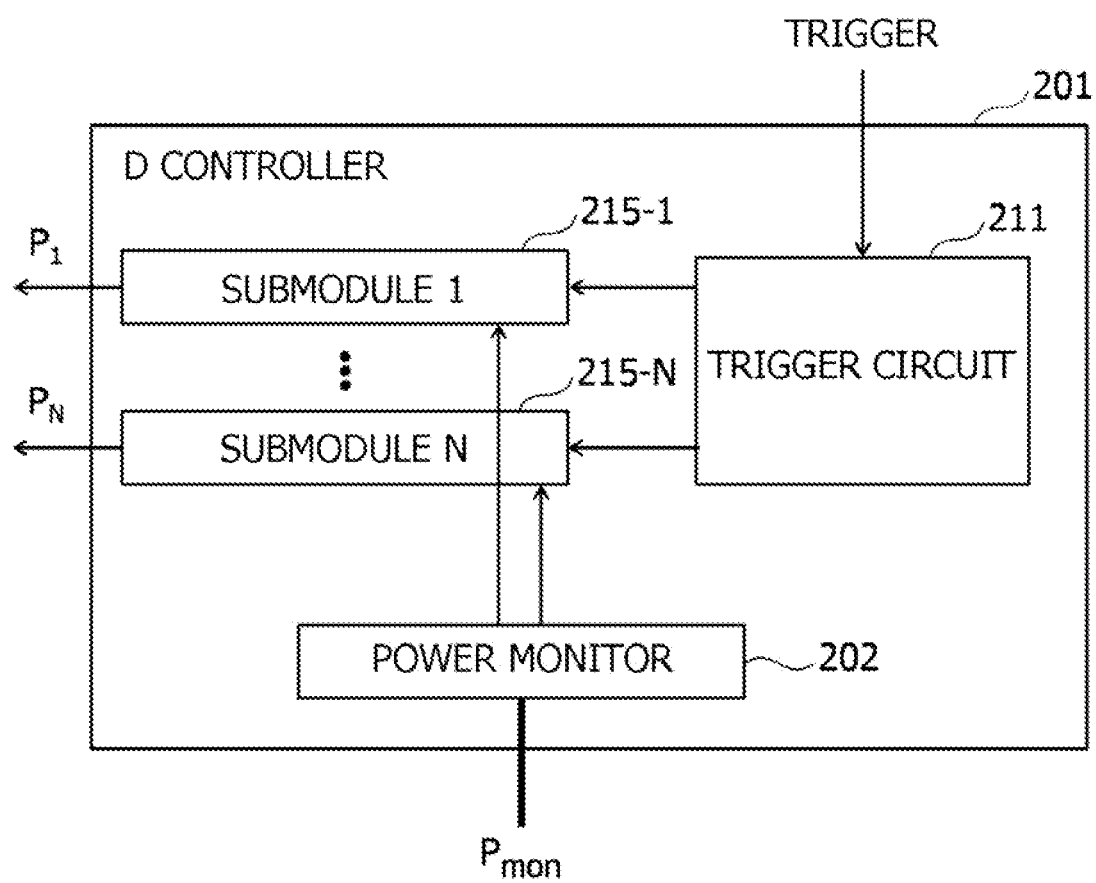
FIG. 20 is a schematic diagram of a D controller according to a third embodiment.

FIG. 20 is a schematic diagram of the D controller 201. The D controller 201 includes a trigger circuit 211, a power monitor 202, and one or more submodules 215. The submodule 215 corresponds to a decrease circuit, Dec in FIGS. 15 and 16. The number of submodules 215 corresponds to the number of phase shifters PS.

The power monitor 202 measures power Pmon of monitor light input from one output port of the first cascade structure 27 and supplies an electrical signal indicating a monitor result to submodules 215-1 to 215-N (hereinafter collectively referred to as "submodule(s) 215 as appropriate). The trigger circuit 211 drives each submodule 215 by inputting a trigger signal. Each of the submodules 215 may be driven sequentially or simultaneously.

Figure 21:
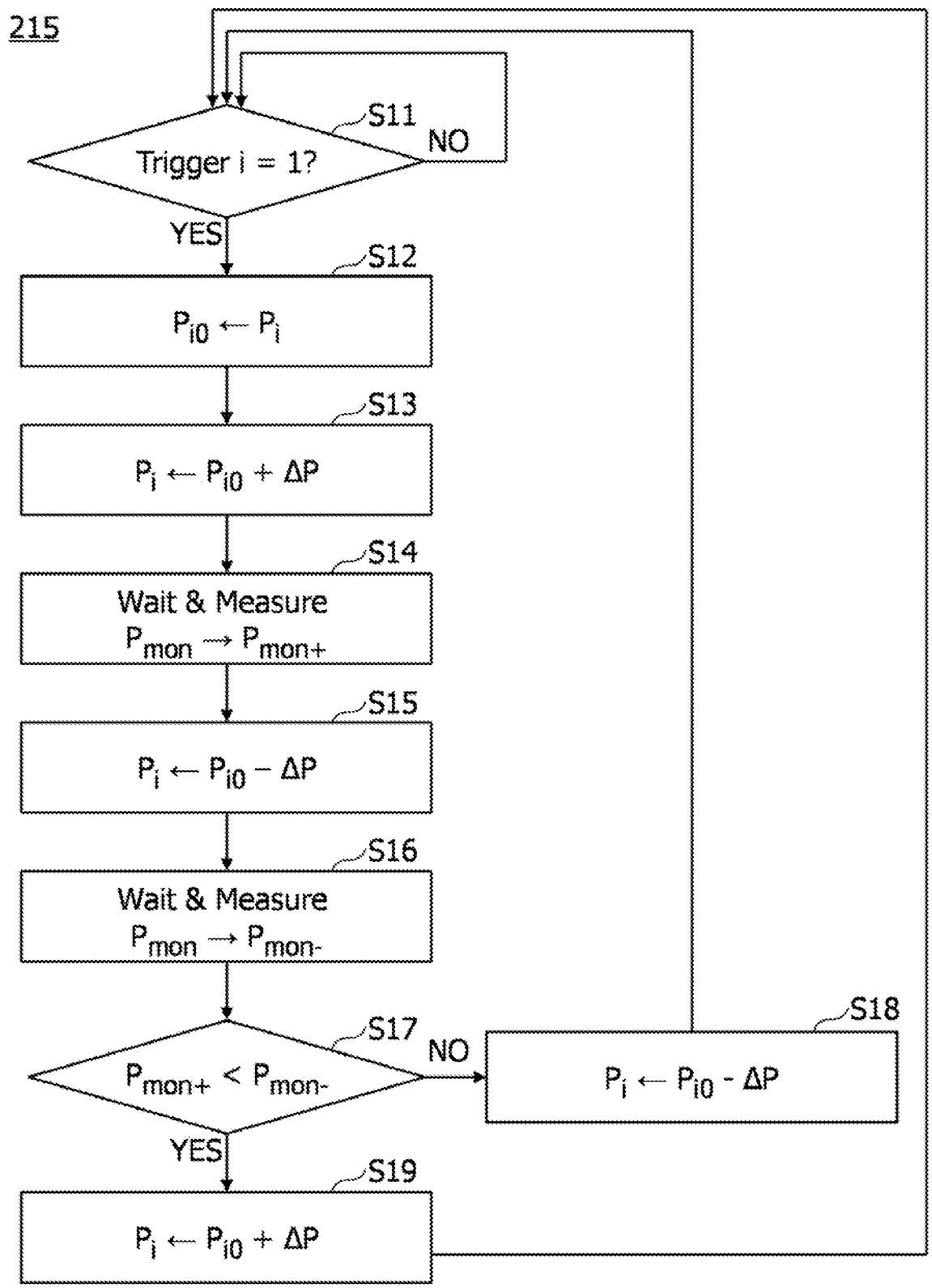
FIG. 21 is a flowchart of processing performed by a submodule of the D controller according to the third embodiment.

FIG. 21 is a flowchart of processing performed by the i-th submodule 215 (i is a natural number from 1 to N). First, whether or not an operation of the i-th submodule 215-i has been triggered is determined (S11). The presence or absence of the trigger may be determined according to whether a trigger flag of the i-th submodule 215-i is set to "1". The flag value is continuously monitored until the trigger flag becomes "1" (the loop in the case of No in S11). When the trigger flag becomes "1", heater power Pi of the corresponding phase shifter PS is initialized to an initial value Pi0 (S12), and a value higher than the initial value Pi0 by ΔP is set as the current heater power Pi (S13).

With the current heater power, the processing waits until a measurement value of the monitor light is input from the power monitor 202, and when the power of the monitor light is obtained, the power is recorded as a power monitor value Pmon+ of when the heater power is increased by ΔP (S14). Next, a value obtained by lowering the heater power by ΔP from the initial value Pi0 is set as the current heater power Pi (S15). With the current heater power, the processing waits until the measurement value of the monitor light is input from the power monitor 202, and when the measurement value is obtained, the power is recorded as a power monitor value Pmon− of when the heater power is decreased by ΔP (S16).

The obtained monitor values are compared to determine whether or not Pmon− is larger than Pmon+(Pmon+ <Pmon−) (S17). When Pmon+ is smaller (Yes in S17), the control to increase the heater power by ΔP becomes control in a direction of decreasing the power of the optical input, so Pi0+ΔP is set to the current heater power value Pi (S19). At this point, the trigger of the i-th submodule is turned off, the processing returns to step S11 and repeats S11 until when next the trigger becomes "1".

In the case where Pmon− is equal to or less than Pmon+ (No in S17), the control to lower the heater power by ΔP becomes control in a direction of reducing the power of the optical input. Therefore, Pi0−ΔP is set as the current heater power value Pi (S18), and the processing returns to S11 and repeats S11 until the trigger becomes "1". By the processing of FIG. 21, the D controller 201 is controlled to reduce the optical input power.

Figure 22:
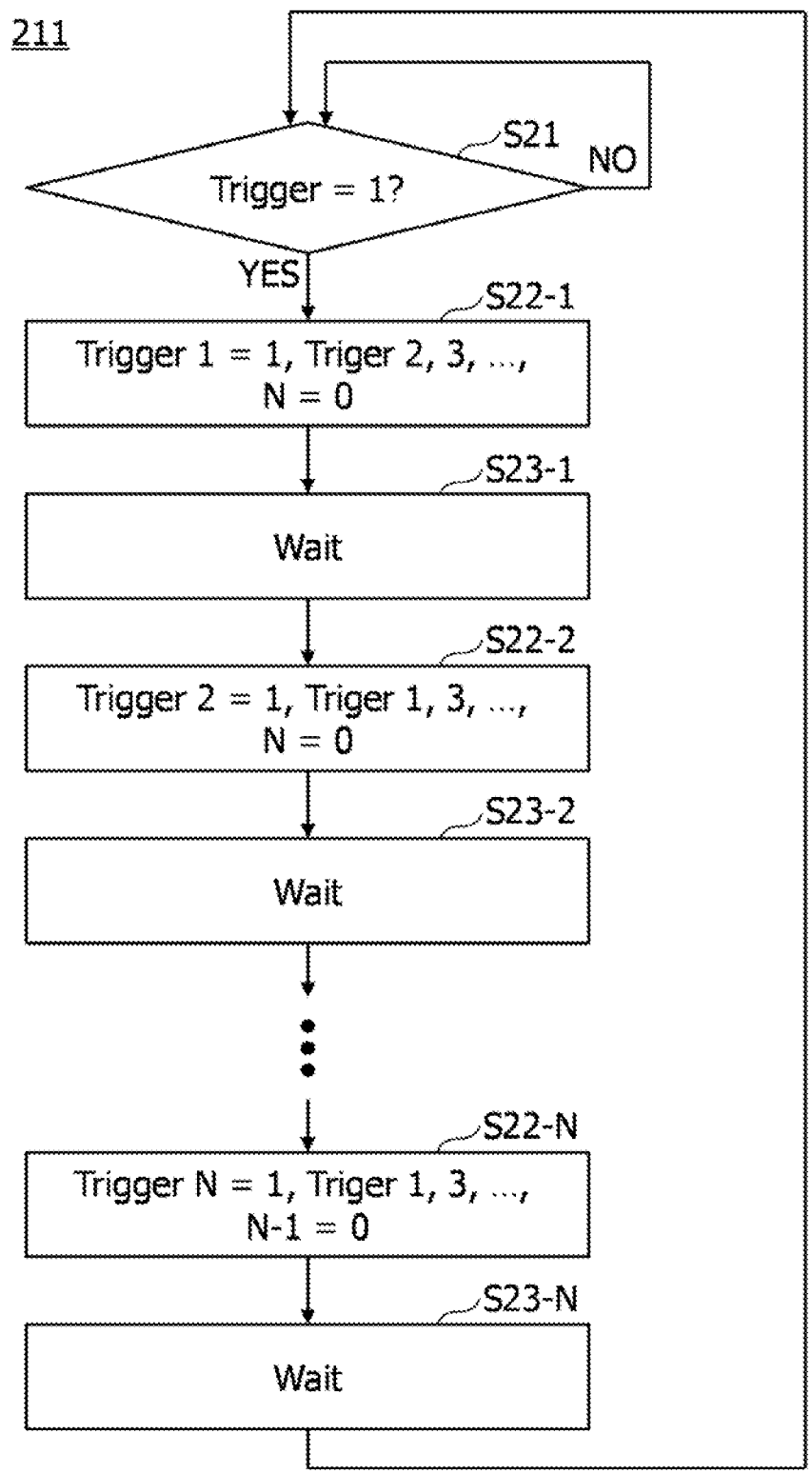
FIG. 22 is a flowchart of processing performed by a trigger circuit of the D controller according to the third embodiment.

FIG. 22 is a flowchart of processing performed by the trigger circuit 211. First, the trigger circuit 211 determines whether or not the input trigger signal is on (S21), and the processing repeats S21 until the trigger signal is turned on. The trigger state may be determined by, for example, whether or not the value of the input trigger signal is "1". When the trigger signal is turned on (Yes at S21), the N submodules 215 are driven sequentially or simultaneously. FIG. 22 illustrates an example of sequentially driving the N submodules 215. That is, the trigger flag of the submodule 215-1 is set to "1", and the trigger flags of the other submodules 215-2 to 215-N are set to "0" (S22-1). The processing waits for a predetermined time (S23-1) and triggers the next submodule 215-2 (S23-2). After repeating steps S22 and S23 for all the submodules 215, the processing return to S21 and repeat S21 until when next the trigger signal is turned on.

By the above processing, the first unit circuit 20 is controlled at the timing of the trigger. Reducing the monitor light power by the D controller 201 makes it possible to reduce a phase relationship gap between two output ports of the phase shifter, that is, an optical path length error. Reducing the optical path length error and setting the optical path length as designed make it possible to correct filter characteristics as designed, which is suitable for a Nyquist filtering effect.

Fourth Embodiment: Control of Second Unit Circuit

Figure 23:
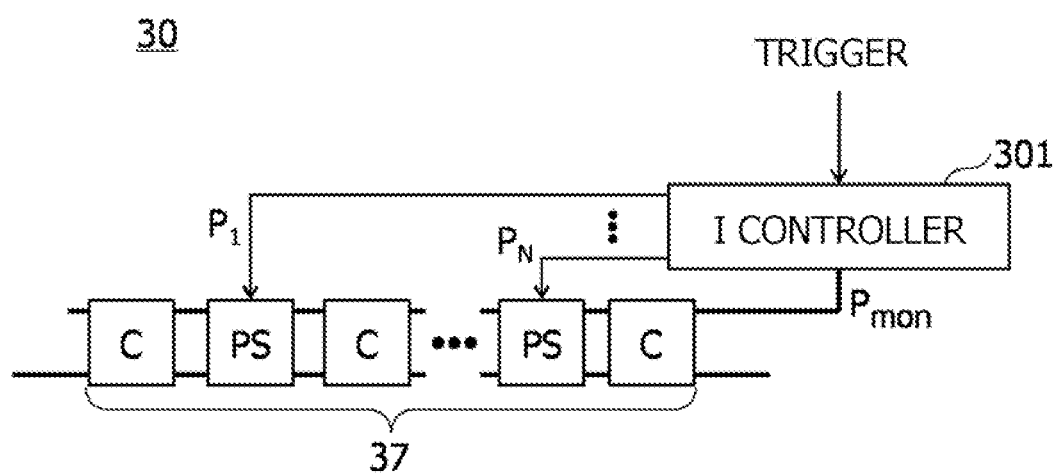
FIG. 23 is a diagram for describing a control configuration of a second unit circuit according to a fourth embodiment.

FIG. 23 is a diagram for describing a control configuration of a second unit circuit 30. As described in the first embodiment and the second embodiment, the second unit circuit 30 has a second cascade structure 37 including one or more phase shifters PS connected by a coupler C, and an I controller 301. The I controller 301 starts shaping into a rectangular pulse upon an input of a trigger signal, that is, controlling each phase shifter PS based on a power monitor result. The trigger signal may be input from, for example, a logic device, a microprocessor, or the like provided in a package in which an optical transmitter 1 is housed.

Figure 24:
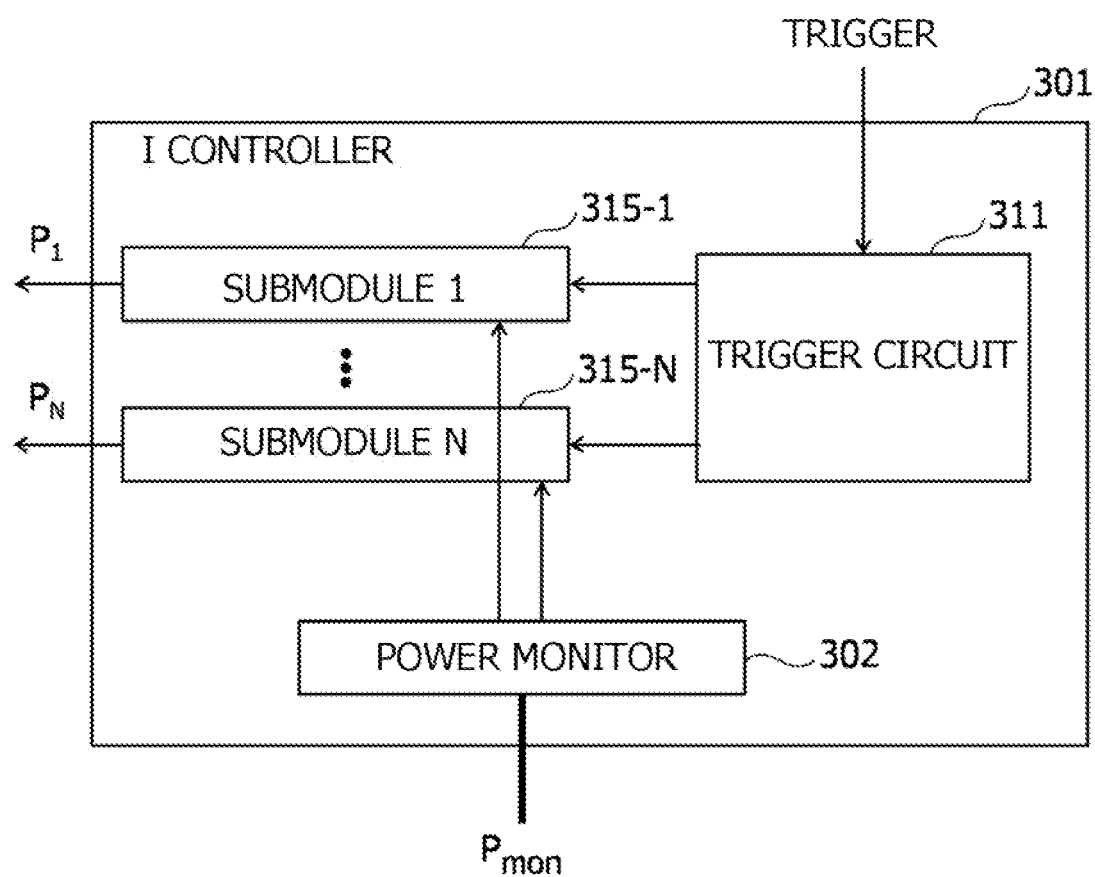
FIG. 24 is a schematic diagram of an I controller according to the fourth embodiment.

FIG. 24 is a schematic diagram of the I controller 301. The I controller 301 includes a trigger circuit 311 and a power monitor 302 and one or more submodules 315. The submodule 315 corresponds to an increase circuit Inc in FIG. 17. The submodules 315 are provided as many as the number of phase shifters PS connected in cascade.

The power monitor 302 measures power Pmon of monitor light input from one output port of the second cascade structure 37 and supplies an electrical signal indicating a monitor result to each submodule 315. The trigger circuit 311 turns on triggers of the submodules 315-1 to 315-N by inputting a trigger signal. Operations of the submodules 315-1 to 315-N may be driven sequentially or simultaneously.

Figure 25:
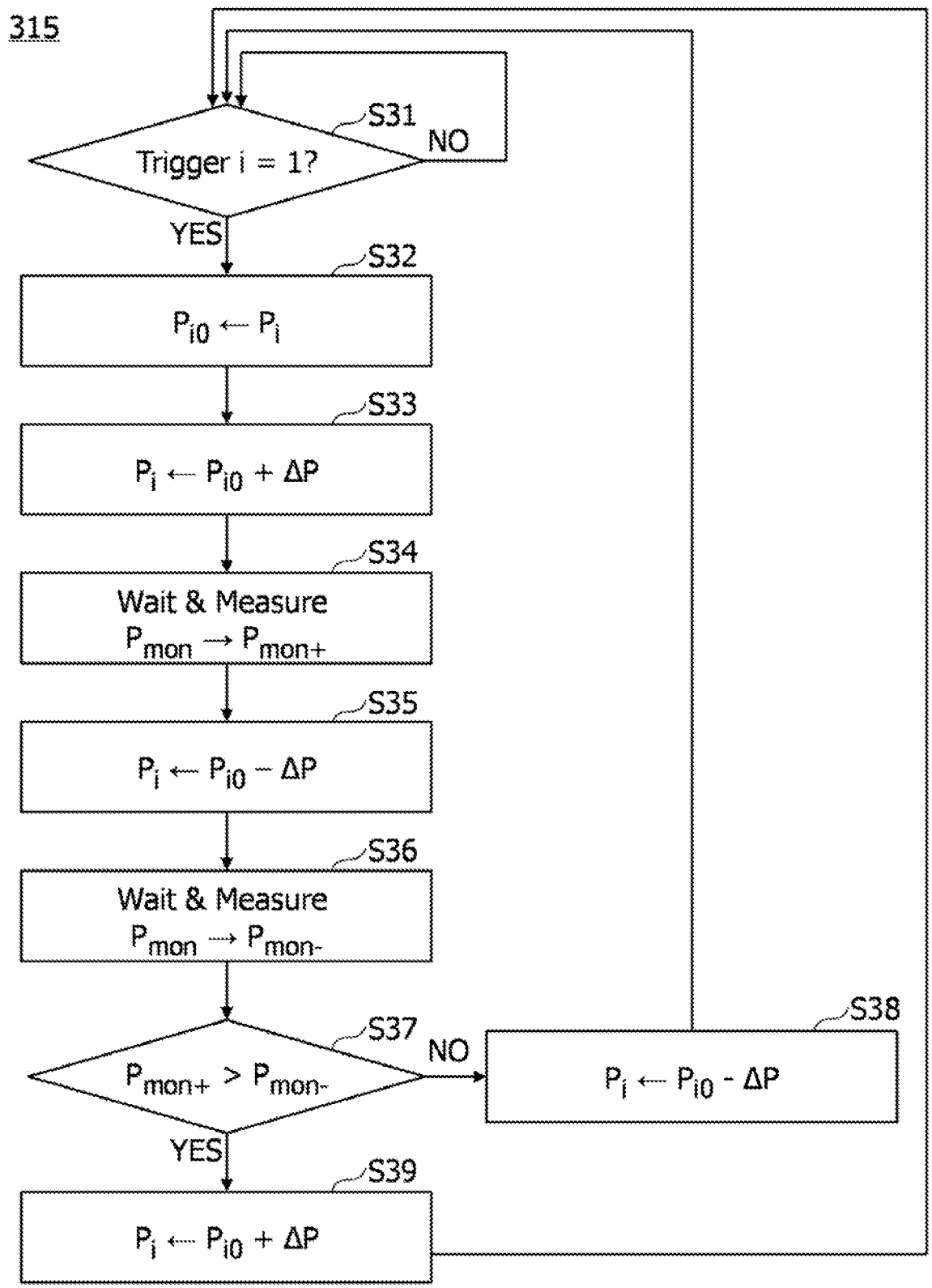
FIG. 25 is a flowchart of processing performed by a submodule of the I controller according to the fourth embodiment.

FIG. 25 is a flowchart of processing performed by the i-th submodule 315 (i is a natural number from 1 to N). First, whether or not an operation of the i-th submodule 315-$i$ has been triggered is determined (S31). The presence or absence of the trigger may be determined according to whether a trigger flag of the i-th submodule 315-$i$ is set to "1". The flag value is continuously monitored until the trigger flag becomes "1" (the loop in the case of No in S31). When the trigger flag becomes "1", heater power Pi of the corresponding phase shifter PS is set to an initial value Pi0 (S32), and a value higher than the initial value Pi0 by $\Delta P$ is set as the current heater power Pi (S33).

With the current heater power, the processing waits until the measurement value of the monitor light is input from the power monitor 302, and when the measurement value is obtained, the power is recorded as a power monitor value Pmon+ of when the heater power is increased by $\Delta P$ (S34). Next, a value obtained by lowering the heater power by $\Delta P$ from the initial value Pi0 is set as the current heater power Pi (S35). With the current heater power, the processing waits until the measurement value of the monitor light is input from the power monitor 202, and when the measurement value is obtained, the power is recorded as a power monitor value Pmon− of when the heater power is decreased by $\Delta P$ (S36).

The obtained monitor values are compared to determine whether or not Pmon− is smaller than Pmon+ (Pmon+>Pmon−) (S37). When Pmon+ is larger (Yes in S37), the control to increase the heater power by $\Delta P$ becomes control in a direction of increasing the power of the optical input, so Pi0+$\Delta P$ is set to the current heater power value Pi (S39). At this point, the trigger is turned off by a trigger circuit 211, the processing returns to step S31 and repeats S31 until when next the trigger becomes "1".

When Pmon− is equal to or larger than Pmon+ (No in S37), the control to lower the heater power by $\Delta P$ becomes control in a direction of increasing the power of the optical input. Therefore, Pi0−$\Delta P$ is set as the current heater power value Pi (S38), and the processing returns to S31 and repeats S31 until the trigger becomes "1". By the processing of FIG. 22, the control to increase the optical input power is performed by the second unit circuit 30.

Figure 26:
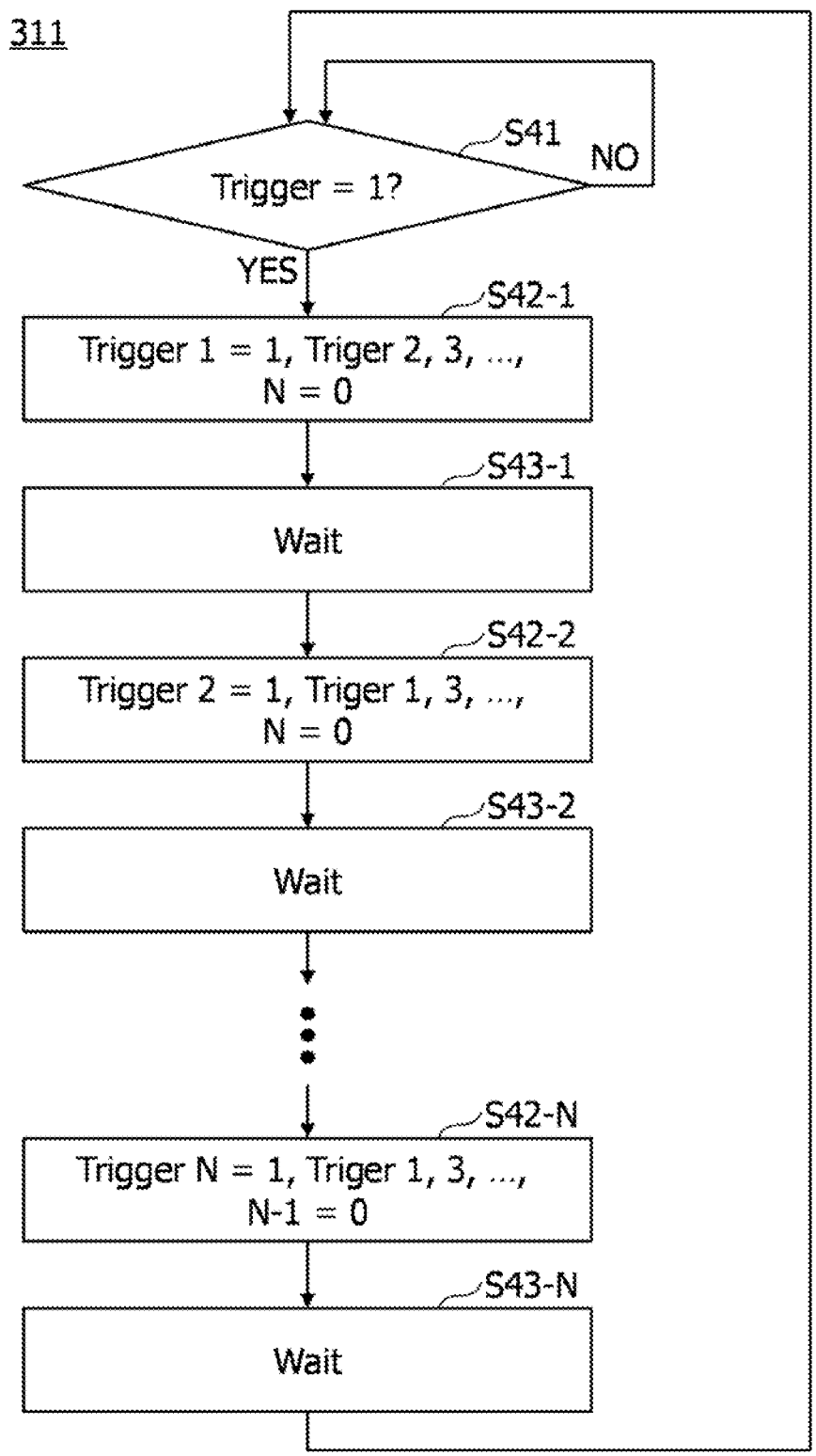
FIG. 26 is a flowchart of processing performed by a trigger circuit of the I controller according to the fourth embodiment.

FIG. 26 is a flowchart of processing performed by the trigger circuit 311. First, whether or not the input trigger signal is on is determined (S41), and the processing repeats S41 until the trigger signal is turned on. The trigger state may be determined by, for example, whether or not the value of the input trigger signal is "1". When the trigger signal is turned on (Yes at S41), the N submodules 315 are driven sequentially or simultaneously. FIG. 23 illustrates an example of sequentially driving the N submodules 315. That is, the trigger flag of the submodule 315-1 is set to "1", and the trigger flags of the other submodules 315-2 to 315-N are set to "0" (S42-1). The processing waits for a predetermined time (S43-1) and triggers the next submodule 315-2 (S43-2). After repeating steps S42 and S43 for all the submodules 315, the processing return to S41 and repeat S41 until when next the trigger signal is turned on.

By the above processing, the second unit circuit 30 is controlled at the timing of the trigger.

<Modification of Optical Element>

Figure 27:
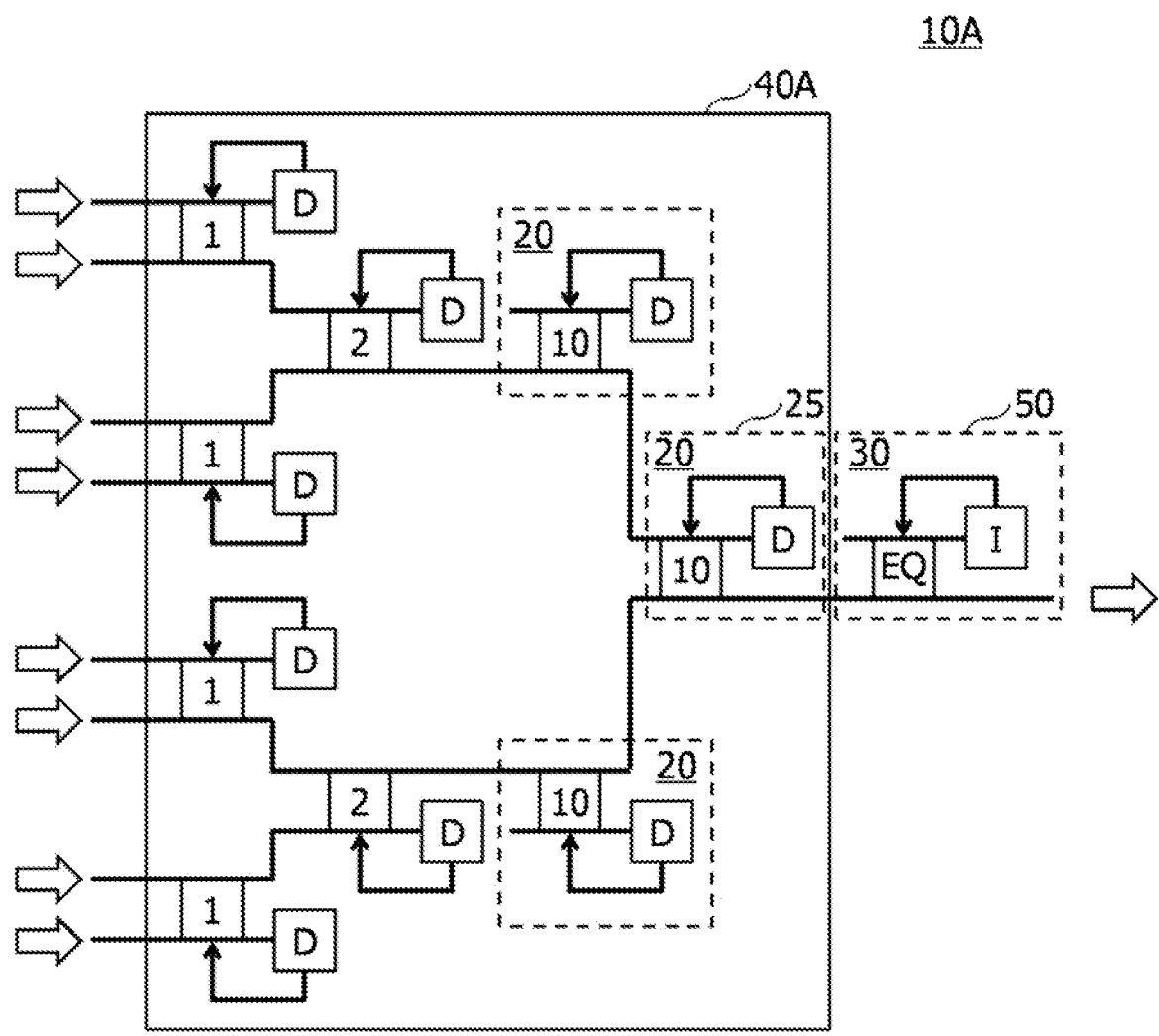
FIG. 27 is a schematic diagram of a modification of an optical element.

FIG. 27 illustrates an eight-channel optical element 10A as a modification of the optical element. The optical element 10A has a combiner 40A and an equalizer 50. The configuration of a first unit circuit 20 used in the combiner 40A is the same as that illustrated in FIG. 7. The configuration of a second unit circuit 30 used in the equalizer 50 is the same as that illustrated in FIG. 8.

The number of phase shifters PS is ten in the first unit circuit 20 in the final stage of the cascade circuit of the combiner 40A and the first unit circuit 20 constituting a combiner circuit 25. An output of the combiner circuit 25 is connected to an input of the equalizer 50.

Figures 28A, 28B:
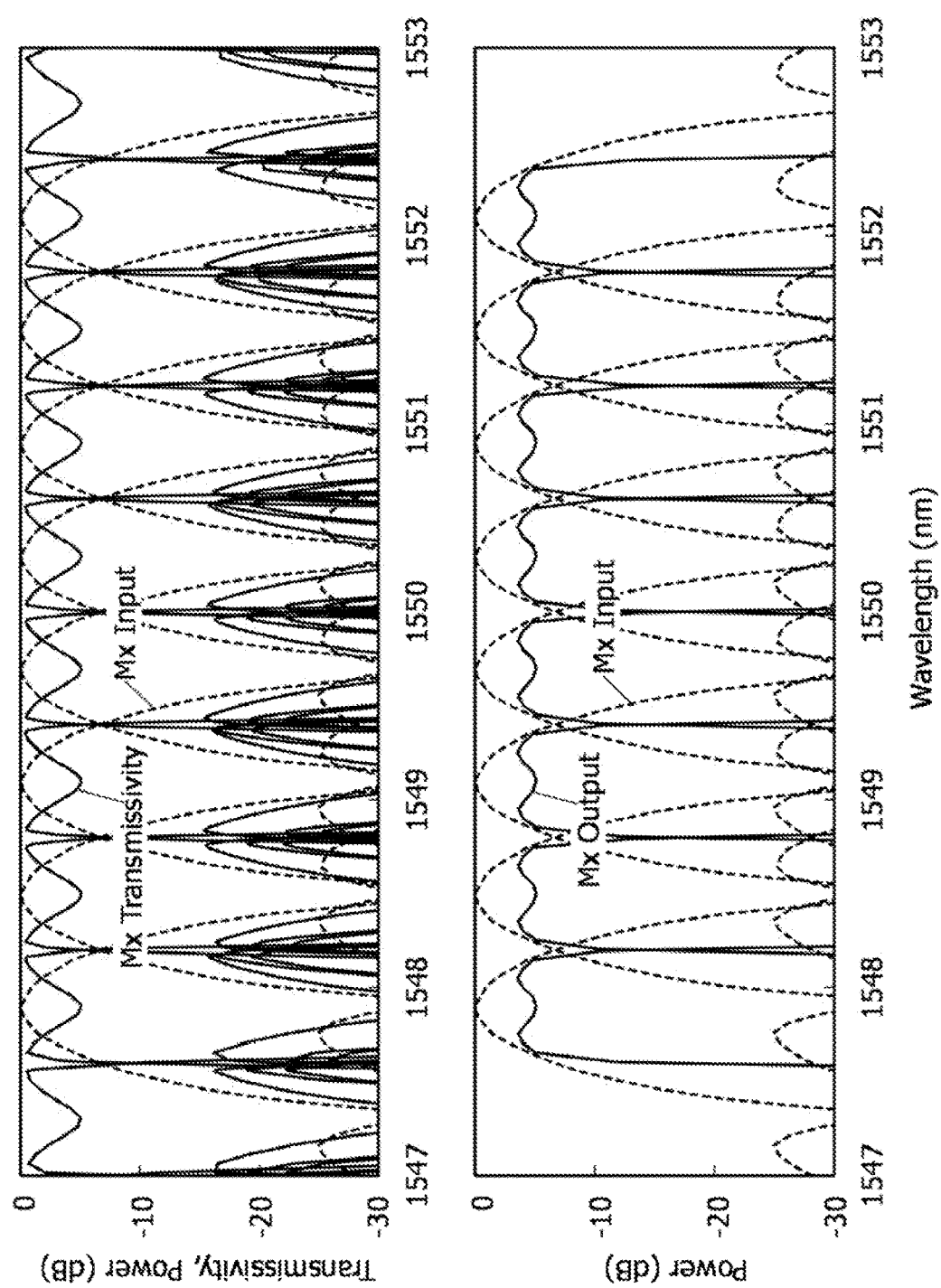
FIG. 28A is a diagram illustrating an effect of an equalizer of the optical element of FIG. 27.
FIG. 28B is a diagram illustrating an effect of an equalizer of the optical element of FIG. 27.

FIGS. 28A and 28B are diagrams illustrating an effect of the equalizer 50 of the optical element 10A of FIG. 27. In FIG. 28A, the broken line represents a power spectrum of an optical signal input from each port to the optical element 10A and the solid line represents a transmission spectrum of the equalizer 50. As described above, the transmissivity of the equalizer 50 changes periodically such that a valley of the transmissivity comes to a peak of an input waveform. In FIG. 28B, the broken line represents a power spectrum of an optical signal input to the optical element 10A and the solid line represents a power spectrum of the optical signal output from the equalizer 50.

In the equalizer 50, the I controller 301 controls the valley of the transmissivity to match the peak of the input light signal. The optical signal combined by the combiner 40A is shaped into a rectangular pulse with a peak flattened as the optical signal passes through the equalizer 50. An upper end of the output power spectrum is slightly recessed due to the transmissivity that sinusoidally changes, but it does not significantly affect the effect of improving spectral efficiency by flattening the peak.

Figure 29:
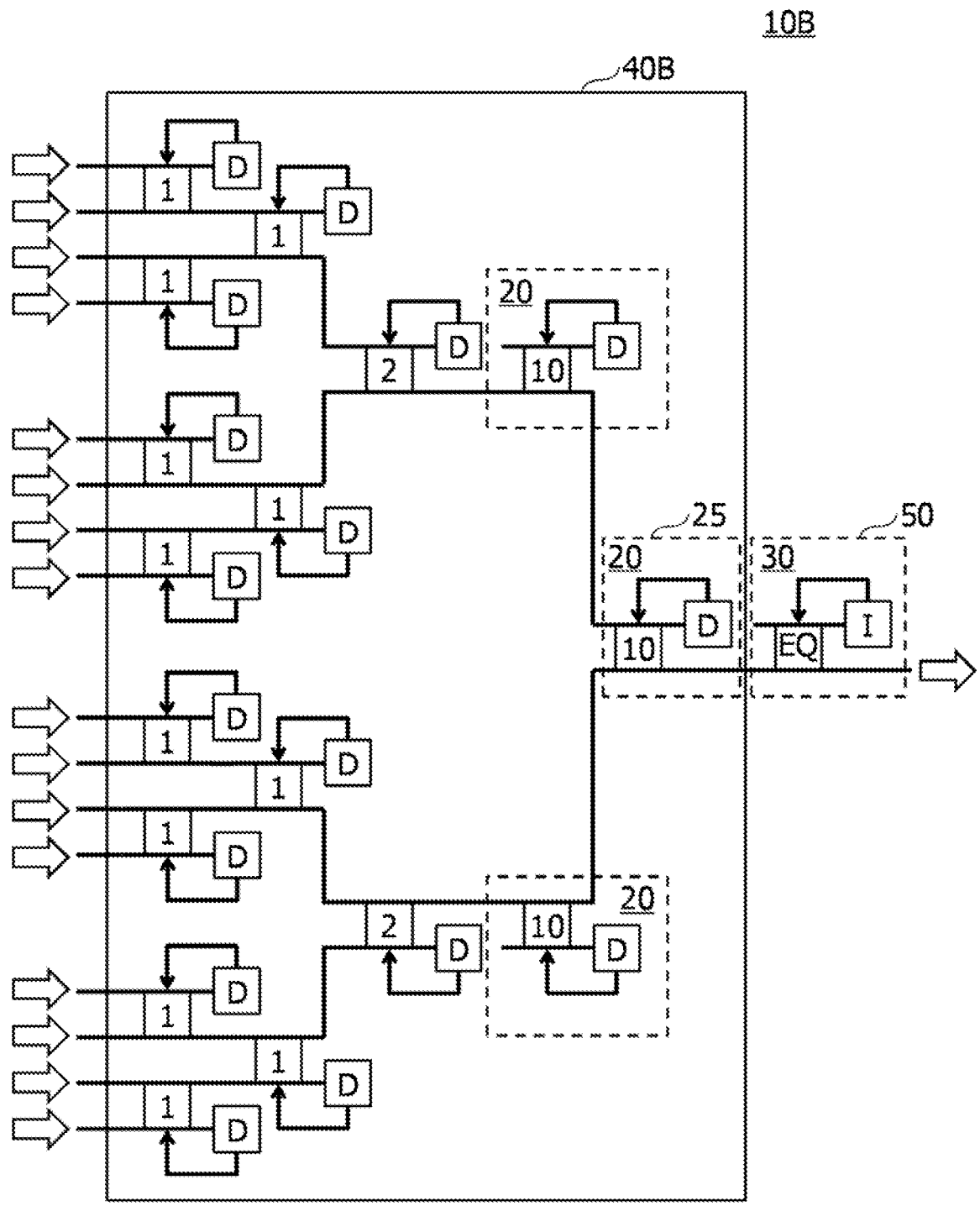
FIG. 29 is a schematic diagram of another modification of the optical element.

FIG. 29 is a schematic diagram of a 16-channel optical element 10B, which is another modification of the optical element. The optical element 10B has a combiner 40B and an equalizer 50. The configuration of the first unit circuit 20 used in the combiner 40B is the same as that illustrated in FIG. 7. The configuration of a second unit circuit 30 used in the equalizer 50 is the same as that illustrated in FIG. 8.

The number of phase shifters PS is ten in the first unit circuit 20 of the combiner circuit 25 of the combiner 40B and the two first unit circuits 20 connected to the combiner circuit 25. An output of the combiner circuit 25 is connected to an input of the equalizer 50.

FIGS. 30A and 308 are diagrams illustrating an effect of the equalizer 50 of the optical element 10B of FIG. 29. In FIG. 30A, the broken line represents a power spectrum of an optical signal input from each port to the optical element 10B and the solid line represents a transmission spectrum of the equalizer 50. In FIG. 30B, the broken line represents a power spectrum of an optical signal input to the optical element 108 and the solid line represents a power spectrum of the optical signal output from the equalizer 50. It can be seen that even in the case where the number of input ports is 16, the optical element 108 shapes a favorable rectangular pulse over an entire C band.

<Power Consumption Reduction Effect>

Figure 31:
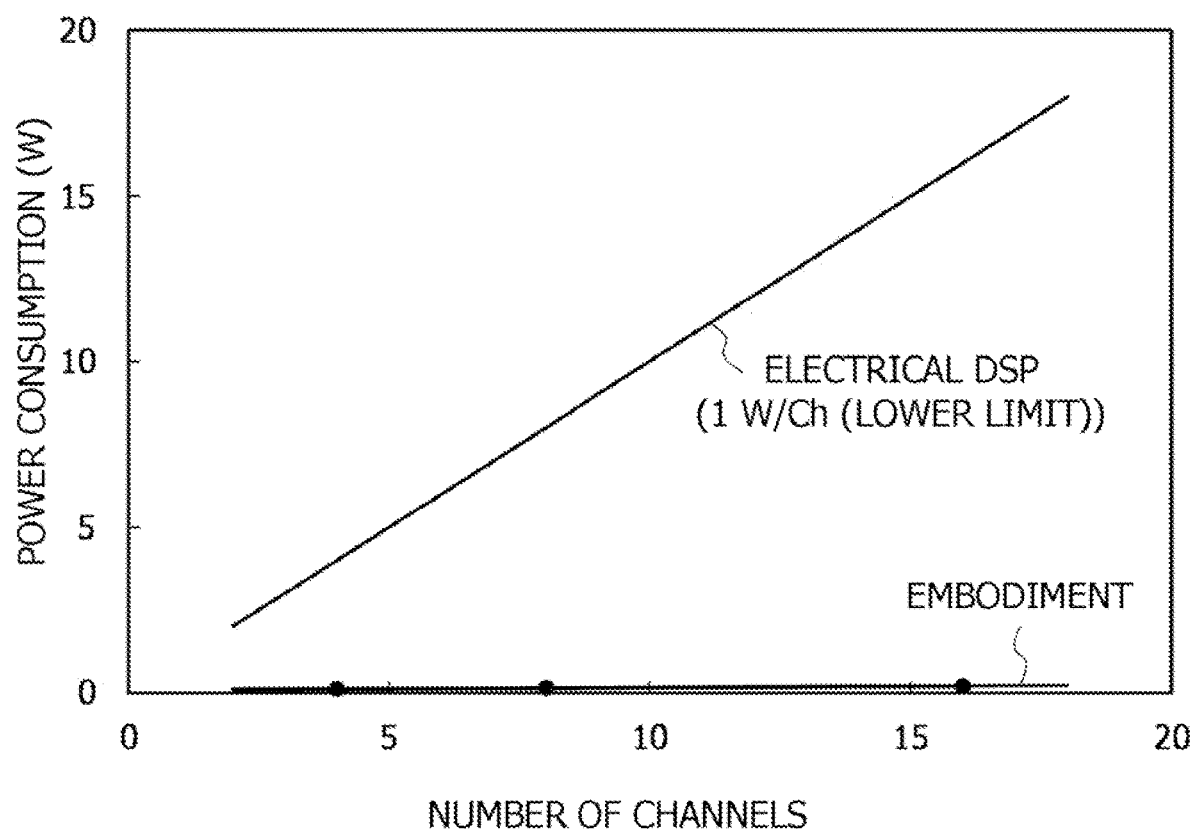
FIG. 31 is a diagram illustrating a power consumption reduction effect of the optical element according to the embodiment.

FIG. 31 is a diagram illustrating a power consumption reduction effect of the optical element according to the embodiment. The horizontal axis represents the number of channels, and the vertical axis represents power consumption (W). In the case of performing Nyquist shaping using a DSP, the power consumption linearly increases as the number of channels increases. Here, it is assumed that 1 W of power is consumed per channel. Meanwhile, by using the optical element 10 of the embodiment, Nyquist shaping is performed without controlling the DSP and, thus, the power consumption needed for Nyquist shaping is almost nonexistent even if the number of channels increases. The optical element 10 of the embodiment is effective for integrating, downsizing, and increasing the capacity of optical transceivers, which have been limited by power consumption.

Moreover, the above-described automatic correction function of the optical path length error of the optical element 10 suppresses the crosstalk and a favorable pulse waveform can be obtained.

The embodiments have been described based on the specific configuration examples, but the present embodiment is not limited to the above-described examples. The number of the first unit circuits 20 and the number of phase shifters PS included in the first unit circuit 20 constituting the cascade circuit of the combiner 40 are appropriately selected so as to obtain optimum communication quality according to the number of channels. The number of phase shifters PS included in the second unit circuit 30 of the equalizer 50 may be one, but two or more may be connected in cascade as needed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical element including a plurality of first circuits, the optical element comprising:
    a first cascade circuit in which one or more of first circuits included in the plurality of first circuits are connected in cascade, the first cascade circuit receiving an optical signal output from a plurality of optical modulators;
    a second cascade circuit in which one or more of first circuits included in the plurality of first circuits are connected in cascade, the second cascade circuit receiving the optical signal; and
    a combiner circuit configured to connect the first cascade circuit and the second cascade circuit, wherein
    a first circuit included in the plurality of first circuits includes:
    a first cascade structure in which N (N is an integer of 1 or larger) of 2-input and 2-output phase shifters and N+1 of 2-input and 2-output couplers are alternately connected in cascade,
    a first controller configured to control the N phase shifters in a direction in which optical input power decreases, the first controller being connected to one of two outputs of the first cascade structure, and
    the first cascade circuit and the second cascade circuit include a filter circuit that transmits the optical signal at twice a period of a frequency grid of the optical signal.

2. The optical element according to claim 1, wherein the first controller includes one optical input from the first cascade structure and N or more electrical outputs connected to the N phase shifters.

3. The optical element according to claim 1, wherein the first circuit in a final stage of the first cascade circuit is connected to one input of the combiner circuit, and the first circuit in a final stage of the second cascade circuit is connected to another input of the combiner circuit.

4. The optical element according to claim 1, further comprising
    a second circuit configured to connect to an output of the combiner circuit,
    wherein the second circuit includes:
    a second cascade structure in which N (N is an integer of 1 or larger) of 2-input and 2-output second phase shifters and N+1 of 2-input and 2-output second couplers are alternately connected in cascade, and
    a second controller configured to control the second phase shifters in a direction in which optical input power increases, the second controller connecting to one of two outputs of the second cascade structure and including one optical input from the second cascade structure, and N or more electrical outputs connected to the N second phase shifters.

5. The optical element according to claim 4, wherein the second circuit includes a transmission characteristic in which transmissivity with respect to a wavelength periodically changes.

6. The optical element according to claim 4, wherein the second phase shifter of the second circuit is formed using an asymmetric Mach-Zehnder interferometer-type optical waveguide.

7. The optical element according to claim 1, wherein the phase shifter of the first circuit is formed using an asymmetric Mach-Zehnder interferometer-type optical waveguide.

8. An optical transmitter comprising:
    a plurality of optical modulators configured to output an optical signal, and
    an optical element configured to connect to the plurality of optical modulators, the optical element including a plurality of first circuits, the optical element includes:
    a first cascade circuit in which one or more of first circuits included in the plurality of first circuits are connected in cascade,
    a second cascade circuit in which one or more of first circuits included in the plurality of first circuits are connected in cascade, and
    a combiner circuit configured to connect the first cascade circuit and the second cascade circuit,
    a first circuit included in the plurality of first circuits includes:
    a first cascade structure in which N (N is an integer of 1 or larger) of 2-input and 2-output phase shifters and N+1 of 2-input and 2-output couplers are alternately connected in cascade,
    a first controller configured to control the N phase shifters in a direction in which optical input power decreases, the first controller being connected to one of two outputs of the first cascade structure, and
    the first cascade circuit and the second cascade circuit include a filter circuit that transmits the optical signal at twice a period of a frequency grid of the optical signal.

9. The optical transmitter according to claim 8, wherein the first controller includes one optical input from the first cascade structure and N or more electrical outputs connected to the N phase shifters.

10. The optical transmitter according to claim 8, wherein the first circuit in a final stage of the first cascade circuit is connected to one input of the combiner circuit, and the first circuit in a final stage of the second cascade circuit is connected to another input of the combiner circuit.

11. The optical transmitter according to claim 8, wherein the optical element further includes
   a second circuit configured to connect to an output of the combiner circuit,
   wherein the second circuit includes:
      a second cascade structure in which N (N is an integer of 1 or larger) of 2-input and 2-output second phase shifters and N+1 of 2-input and 2-output second couplers are alternately connected in cascade, and
      a second controller configured to control the second phase shifters in a direction in which optical input power increases, the second controller connecting to one of two outputs of the second cascade structure and including one optical input from the second cascade structure, and N or more electrical outputs connected to the N second phase shifters.

12. The optical transmitter according to claim 11, wherein the second circuit includes a transmission characteristic in which transmissivity with respect to a wavelength periodically changes.

13. The optical transmitter according to claim 11, wherein the second phase shifter of the second circuit is formed using an asymmetric Mach-Zehnder interferometer-type optical waveguide.

14. The optical transmitter according to claim 8, wherein the phase shifter of the first circuit is formed using an asymmetric Mach-Zehnder interferometer-type optical waveguide.

* * * * *